United States Patent
Dell'eva et al.

(10) Patent No.: US 10,281,732 B2
(45) Date of Patent: May 7, 2019

(54) SYSTEM AND METHOD FOR AUTOSTEREOSCOPIC IMAGING USING HOLOGRAPHIC OPTICAL ELEMENT

(71) Applicant: Absolute Imaging LLC, Livonia, MI (US)

(72) Inventors: Mark L. Dell'eva, Grand Blanc, MI (US); Hans Ingmar Bjelkhagen, Dyserth (GB)

(73) Assignee: Kughn Absolute Holdings, LLC, Farmington, MI (US)

( * ) Notice: Subject to any disclaimer, the term of this patent is extended or adjusted under 35 U.S.C. 154(b) by 1071 days.

(21) Appl. No.: 14/188,821

(22) Filed: Feb. 25, 2014

(65) Prior Publication Data

US 2014/0168734 A1 Jun. 19, 2014

Related U.S. Application Data

(63) Continuation of application No. 12/948,360, filed on Nov. 17, 2010, now abandoned, which is a
(Continued)

(51) Int. Cl.
*G03H 1/00* (2006.01)
*G02B 27/22* (2018.01)
(Continued)

(52) U.S. Cl.
CPC ............ *G02B 27/225* (2013.01); *G02B 5/32* (2013.01); *G03H 1/0272* (2013.01); *G03H 1/04* (2013.01);
(Continued)

(58) Field of Classification Search
CPC .... G02B 5/32; G02B 5/0278; G02B 27/2214; G02B 27/2228; G03H 1/00; G03H 1/02;
(Continued)

(56) References Cited

U.S. PATENT DOCUMENTS 3,894,756 A * 7/1975 Ward .................. G03H 1/0011
283/109
4,235,505 A 11/1980 Hariharan et al.
(Continued)

FOREIGN PATENT DOCUMENTS

JP 07-020768 A 1/1995
JP 11-242423 A 9/1999
(Continued)

OTHER PUBLICATIONS

International Search Report and Written Opinion dated Jun. 28, 2012 for International Application No. PCT/US2011/061196, International filing date: Nov. 17, 2011.
(Continued)

*Primary Examiner* — Stephone B Allen
*Assistant Examiner* — Jyotsna V Dabbi
(74) *Attorney, Agent, or Firm* — Brooks Kushman P.C.

(57) ABSTRACT

Systems and methods for creating an autostereoscopic display include a holographic optical element (HOE) recorded using coherent light divided into diverging reference and object beams that illuminate the HOE from opposite sides. The object beam passes through first and second diffusers with one diffuser being a directional diffuser to more uniformly illuminate the HOE. Optic elements may be used to more closely match beam diameters and/or profiles of the recording wavelengths. Baffles may be positioned on opposite sides of the HOE with openings aligned proximate the reference beam and object beam paths, respectively, to reduce stray reflections and provide ambient air flow attenuation or damping. One or more edges of the HOE are masked to reduce or prevent stray light from entering and reflecting within the HOE during recording.

20 Claims, 22 Drawing Sheets

Related U.S. Application Data continuation-in-part of application No. 12/883,348, filed on Sep. 16, 2010, now abandoned, which is a continuation-in-part of application No. 12/408,447, filed on Mar. 20, 2009, now abandoned, and a continuation-in-part of application No. 12/428,118, filed on Apr. 22, 2009, now Pat. No. 8,284,234.

(60) Provisional application No. 61/244,880, filed on Sep. 22, 2009.

(51) Int. Cl.
| | |
|---|---|
| G02B 5/32 | (2006.01) |
| G03H 1/04 | (2006.01) |
| G03H 1/02 | (2006.01) |
| H04N 13/302 | (2018.01) |
| H04N 13/366 | (2018.01) |
| G02B 13/22 | (2006.01) |

(52) U.S. Cl.
CPC ......... *G03H 1/0402* (2013.01); *H04N 13/302* (2018.05); *H04N 13/366* (2018.05); *G02B 13/22* (2013.01); *G03H 2001/0439* (2013.01)

(58) Field of Classification Search
CPC ............ G03H 1/26; G03H 1/268; G03H 1/04; G03H 1/0406; G03H 1/22; G03H 2001/043; G11B 7/0065; G03B 21/56; G03B 21/625; G03B 21/606; G03B 21/60; H04N 13/0404; H04N 13/0239; H04N 13/0497; H04N 13/0438; H04N 5/76; G03F 7/001

See application file for complete search history.

(56) References Cited

U.S. PATENT DOCUMENTS

| | | | |
|---|---|---|---|
| 4,537,475 A | 8/1985 | Summers et al. | |
| 4,799,739 A | 1/1989 | Newswanger | |
| 4,943,126 A * | 7/1990 | Lang | G03H 1/20 359/1 |
| 5,291,316 A | 3/1994 | Haberman et al. | |
| 5,521,724 A | 5/1996 | Shires | |
| 5,754,278 A * | 5/1998 | Kurtz | G03B 27/542 355/67 |
| 5,796,500 A * | 8/1998 | Hart | G02B 5/203 359/22 |
| 5,917,622 A | 6/1999 | Diffin et al. | |
| 5,949,559 A * | 9/1999 | Kihara | G03H 1/02 359/22 |
| 6,011,580 A * | 1/2000 | Hattori | G02B 27/225 348/57 |
| 6,036,327 A * | 3/2000 | Blonder | G02B 6/0036 362/329 |
| 6,157,474 A * | 12/2000 | Orr | G02B 5/0252 359/15 |
| 6,219,169 B1 * | 4/2001 | Iizuka | G02B 13/10 359/234 |
| 6,339,504 B1 * | 1/2002 | Oliva | G02B 5/1876 359/641 |
| 6,407,833 B2 | 6/2002 | Klug et al. | |
| 6,614,565 B1 | 9/2003 | Klug et al. | |
| 6,654,183 B2 | 11/2003 | Coufal et al. | |
| 6,842,273 B2 | 1/2005 | Kim | |
| 6,885,484 B2 | 4/2005 | Kasai | |
| 7,046,439 B2 | 5/2006 | Kaminsky et al. | |
| 7,169,375 B2 | 1/2007 | Chisholm | |
| 7,390,532 B2 | 6/2008 | Dellwo et al. | |
| 7,473,721 B2 | 1/2009 | Harada et al. | |
| 7,573,623 B2 | 8/2009 | Kim | |
| 2005/0157359 A1 * | 7/2005 | Bjelkhagen | G02B 5/203 359/15 |
| 2006/0066810 A1 * | 3/2006 | Shestak | G03B 21/28 353/7 |
| 2007/0153397 A1 * | 7/2007 | Destain | G02B 19/0014 359/649 |
| 2008/0138717 A1 | 6/2008 | Bjelkhagen et al. | |
| 2008/0247017 A1 | 10/2008 | Wu et al. | |
| 2009/0010136 A1 | 1/2009 | Knittel | |
| 2009/0128874 A1 | 5/2009 | Iwamura | |
| 2009/0153933 A1 * | 6/2009 | Tsuchiya | G02B 26/101 359/204.1 |
| 2010/0124158 A1 * | 5/2010 | Leto | G11B 7/0065 369/112.23 |
| 2010/0238270 A1 | 9/2010 | Bjelkhagen et al. | |

FOREIGN PATENT DOCUMENTS

| | | |
|---|---|---|
| JP | 2008197246 A | 10/2008 |
| KR | 1020010084383 A | 9/2001 |

OTHER PUBLICATIONS

Grichine et al. "An Integrated Pulsed Holography System for Mastering and Transferring onto AGFA or VR-P emulsions", SPIE 2006, vol. 3358, p. 203-210.

Bjelkhagen et al. "Color silver halide hologram production and mastering", SPIE 1997, vol. 3011, p. 61-69.

Kim et al. "HOEs recorded in silver halide sensitised gelatin emulsions", Proc. SPIE 2000, vol. 3956, p. 354-366.

Bjelkhagen et al. "Large-format color holograms recorded on ultra-high resolution silver-halide emulsion", Proc. SPIE 1996, vol. 2866, p. 227-234.

Bjelkhagen et al. "Progress in color reflection holography", Proc. SPIE 1998, vol. 3358, p. 104-113.

Bjelkhagen et al. "Recording and processing of silver-halide color holograms", Proc. SPIE 1995, vol. 2405, p. 100-107.

Kim et al. "SHSG processing for three-wavelength HOEs recording in silver halide materials", Proc SPIE 2002, vol. 4659, p. 378-387.

Bjelkhagen et al. "Fabrication of ultra-fine-grain silver halide recording material for color holography", Proc. SPIE 2008, vol. 6912, p. 691209-1 through 691209-14.

Kim et al. "Transmission and reflection SHSG holograms", Proc. SPIE 2001, vol. 4296, p. 213-225.

Bjelkhagen et al. "Experimental study of wavelength selections on color holography", Proc. SPIE 1995, vol. 2406, p. 2-9.

Leith et al. "Wavefront Reconstruction with Diffused Illumination and Three-Dimensional Objects", Journal of the Optical Society of America Nov. 1964, vol. 54, No. 11, p. 1295-1301.

Bjelkhagen et al. "Lippmann color holography in a single-layer silver-halide emulsion", Reprinted from Display Holography p. 251-261, Proc. SPIE 1995, vol. 2333, p. 34-48.

Brown. "Techniques for making silver halide reflection holograms that can compete with photopolymers", SPIE 1994, vol. 2176 Practical Holography VIII, p. 120-131.

Trout et al. "Photopolymer Materials for Color Holography", Reprinted from Applications of Optical Holography p. 552-563, Proc. SPIE 1995, vol. 2577, p. 94-105.

Kingfang et al. "Colour reflection holograms with photopolymer plates", SPIE 1989, vol. 1238 Three-Dimensional Holography: Science, Culture, Education, p. 306-310.

Song et al. "Development of 40 inch hybrid hologram screen for auto stereoscopic video display", Proc SPIE 2004, vol. 5290, p. 190-200.

Jones-Bey. "Keplerian beam shaper aims for wide use", Laser Focus World Jul. 1, 2002, vol. 38, No. 7, 3 Pages, http://www.optoiq.com/index/photonics-technologies-applications/lfw-display/lfw-articles-, Retrieved Jul. 13, 2010.

"Holographic Beam Homogenizer", Technology Profile # 33, Jun. 29, 1999, http://www.mdatechnology.net/techprofile.aspx?id=33, Retrieved Jul. 5, 2010, 3 Pages.

Kanzler et al. "Diffractive Laser Beam Shaping for Holography", Proc. SPIE 2009, vol. 7430, p. 743006-743006-6.

Mandel. "Color Imagery by Wavefront Reconstruction", Letters to the Editor Dec. 1965, vol. 55, p. 1697-1698.

(56) References Cited

OTHER PUBLICATIONS

Abstract for Hoffnagle et al. "Beam shaping with a plano-aspheric lens pair", Opt Eng. 2003, vol. 42, 1 Page.
Abstract for Denisyuk et al. "Method of forming an autostereoscopic image", Journal of Optical Technology 2005, vol. 72, Issue 9, 1 Page.
Flat-Top Apodizer (Gaussian Compensating Plate), http://www.ofr.com/oc-11_apodizer.htm, Retrieved Jul. 13, 2010, 2 Pages.
International Search Report dated Apr. 27, 2012, for PCT/US2011/050911 filed Sep. 9, 2011.
Preliminary Report on Patentability dated Mar. 19, 2013, for PCT/US2011/050911 filed Sep. 9, 2011.
Preliminary Report on Patentability dated May 21, 2013, for PCT/US2011/061196 filed Nov. 17, 2011.

* cited by examiner

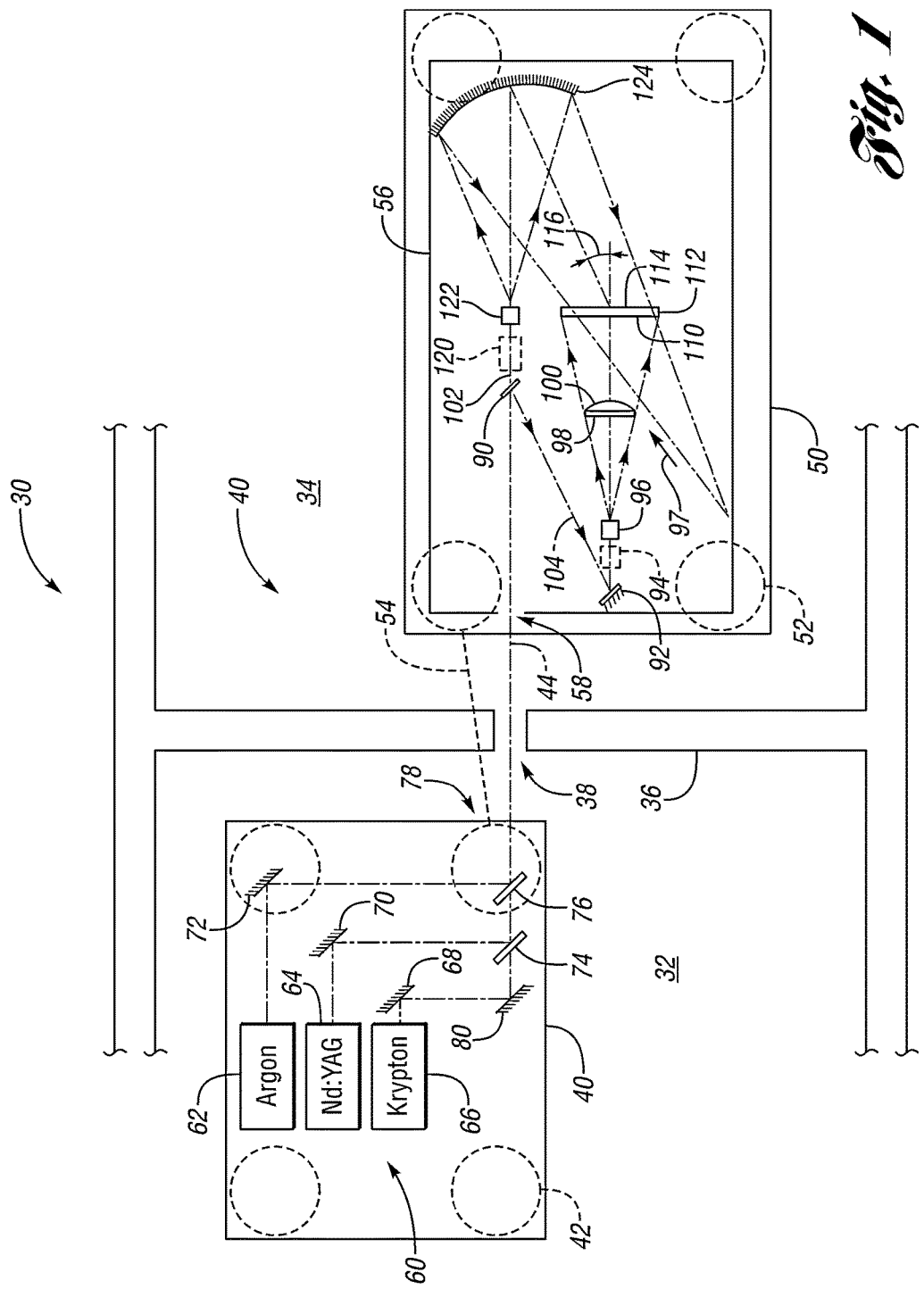

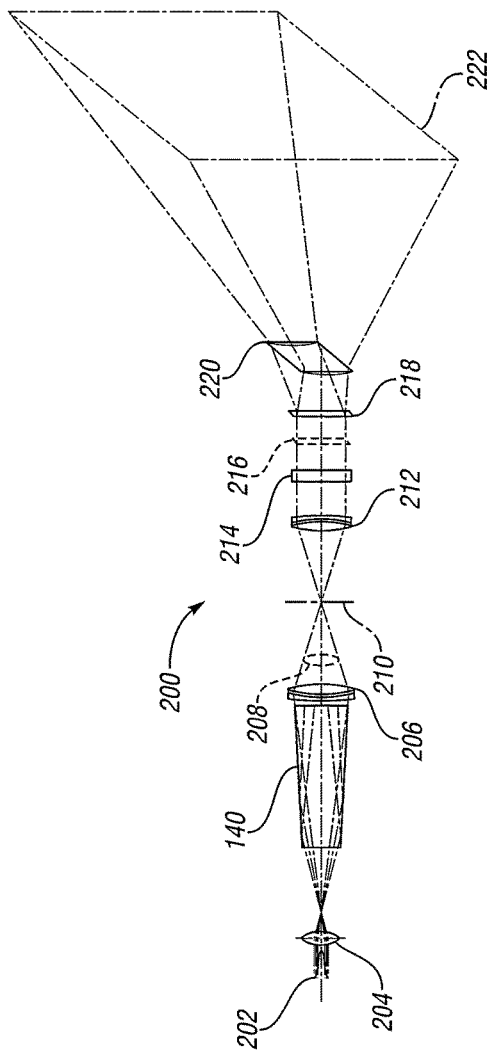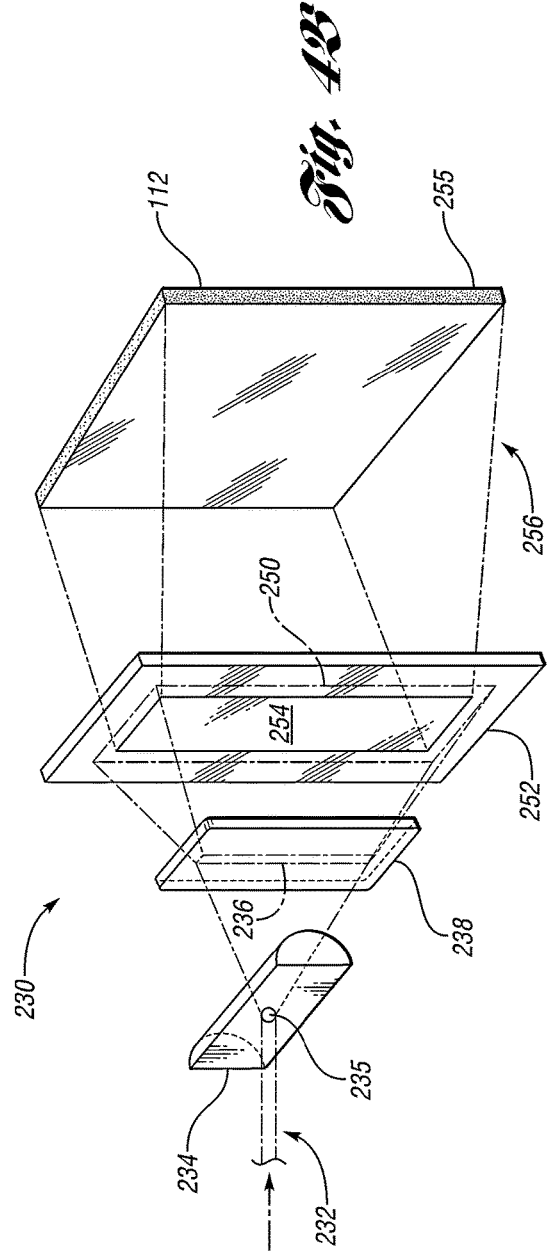

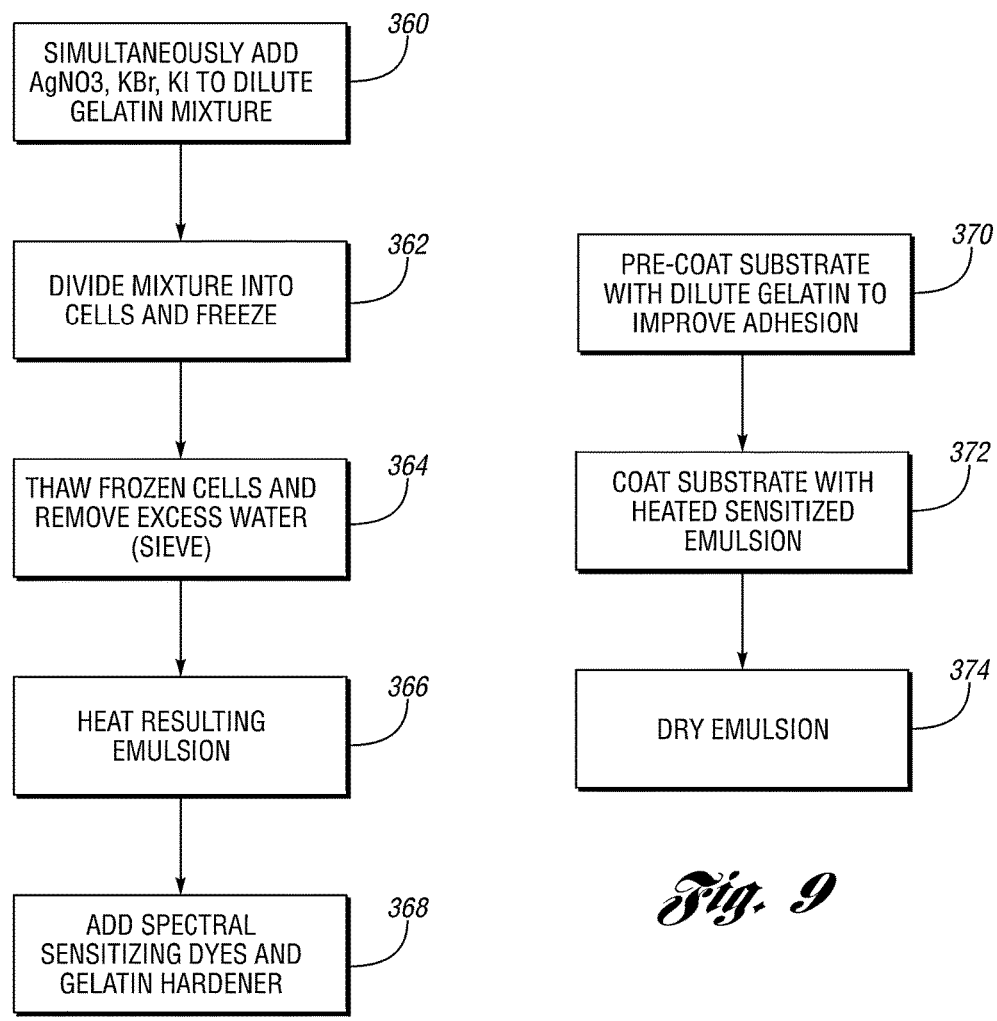

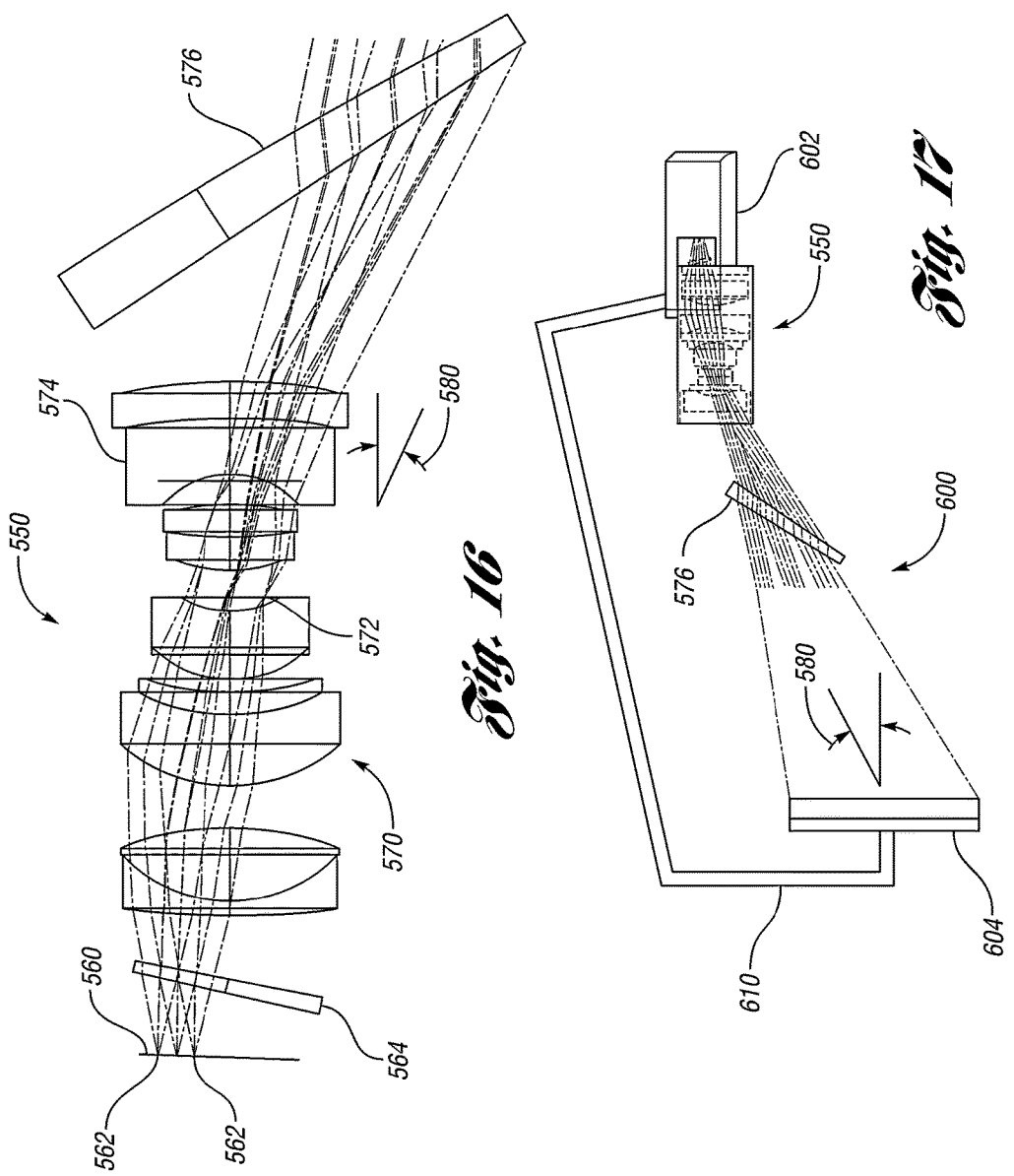

SYSTEM AND METHOD FOR AUTOSTEREOSCOPIC IMAGING USING HOLOGRAPHIC OPTICAL ELEMENT

CROSS-REFERENCE TO RELATED APPLICATIONS

This application is a continuation of U.S. patent application Ser. No. 12/948,360 filed Nov. 17, 2010, which is a continuation-in-part of commonly owned and copending U.S. patent application Ser. No. 12/883,348 filed Sep. 16, 2010, titled "System and Method for Autostereoscopic Imaging" which claims the benefit of U.S. Ser. No. 61/244,880 filed Sep. 22, 2009 and is a continuation-in-part of commonly owned and copending U.S. patent application Ser. No. 12/408,447 filed Mar. 20, 2009, and Ser. No. 12/428,118 filed Apr. 22, 2009, the disclosures of all of which are incorporated by reference in their entirety.

BACKGROUND

1. Field

The present disclosure relates to systems and methods for creating and displaying autostereoscopic three-dimensional images using a holographic optical element.

2. Background Art

Stereoscopic display devices separate left and right images corresponding to slightly different views or perspectives of a three-dimensional scene or object and direct the images to a viewer's left and right eye, respectively. The viewer's visual system then combines the left-eye and right-eye views to perceive a three-dimensional or stereo image. A variety of different strategies have been used to capture or create the left and right views, and to deliver or display them to one or more viewers. Stereoscopic displays often rely on special glasses or headgear worn by the viewer(s) to deliver the left and right images to the viewer's left and right eyes. These have various disadvantages. As such, a number of strategies have been developed to provide autostereoscopic displays, which deliver the left and right images to corresponding eyes of one or more viewers without the use of special glasses or headgear.

One strategy for displaying an autostereoscopic image uses a parallax barrier. This method uses interlaced left and right images and places a layer of material with very fine slits at a precise distance from the image plane of a flat panel display (typically LCD), relying on parallax to separate right-eye and left-eye viewing perspectives so that each eye sees the corresponding left/right image. However, horizontal resolution and light output are adversely impacted with this approach, and the "sweet spot", or zone where one can best visualize a stereoscopic image, is very small.

Another attempt at providing an autostereoscopic image uses a Fresnel lens to direct reflected light from left and right stereo video sources to corresponding left-eye and right-eye viewing locations. While the use of a Fresnel lens enables lower volume and weight for large aperture, short focal length lenses, image quality or resolution is reduced. As such, three-dimensional imaging systems based on parallax barriers and Fresnel lenses, as well as those using lenticular sheets, have generally fallen short of user expectations.

Various strategies for creating an autostereoscopic display have incorporated a holographic optical element (HOE) that is made by holographically recording an image of a diffuse viewing zone or eyebox created by a rectangular ground glass plate. During replay, the HOE is co-illuminated with left and right images from different horizontal angles and redirects the images to corresponding left-eye and right-eye viewing zones or eyeboxes for viewing by the left and right eyes of the viewer. In one approach, the HOE is recorded with a single monochromatic light source, such as a laser, with the ground glass plate positioned at the achromatic angle to create a rainbow hologram. During replay with broadband (white) light, the image of the ground glass plate is dispersed along the achromatic angle. If the ground glass plate is longer than the dispersion, there will be an area equal to the difference between the object and the dispersion where all colors of the spectrum overlap to provide a full color display. However, the region of color fidelity is generally of very limited extent such that any vertical movement by the viewer results in color shifting and poor color reproduction of the projected image. Such effects are distracting and make this approach unsuitable for a variety of applications, particularly where color fidelity is desired, such as in medical imaging, entertainment, and a variety of other applications.

Attempts to solve various problems associated with an autostereoscopic display system incorporating a HOE have included the use of multiple monochromatic sources implemented by lasers of different emission wavelengths to record the HOE. In various approaches, three or more different wavelengths are used during the recording process that generally include at least some wavelengths of red, green, and blue light to improve the color fidelity within a larger viewing zone of the display during playback. This introduces numerous challenges due to the frequency (or wavelength) sensitivity/dependence of the recording medium and various optical elements used in both the recording and playback of the HOE. A holographic recording medium having low scattering and capable of high resolution with appropriate sensitivity to the recording wavelengths is generally needed for the master or original recording. One solution is to use different media for the different wavelengths with the media layered or sandwiched together to produce the HOE viewing screen. However, this approach introduces additional complexities associated with having multiple recording set-ups, precise control of environmental conditions during multiple exposures, alignment or registration of the layers, and the like. More recently, the availability of a single panchromatic medium with suitable sensitivity and scattering characteristics for the recording wavelengths, such as a high resolution silver halide emulsion, for example, has facilitated recording in a single layer. The emulsion may be exposed using multiple wavelengths either simultaneously or sequentially during the recording process and developed using known holographic developing techniques. Use of a single recording medium and simultaneous recording of multiple wavelengths greatly simplifies the recording and developing process.

During recording of an HOE, a diffuser, which may be implemented by a ground glass plate, having the desired geometry of a viewing zone or eyebox is illuminated by an object beam passing through the diffuser and interfering with a reference beam to create an interference pattern recorded in the panchromatic medium. The laser beams used during recording generally have a non-uniform intensity distribution or profile with higher intensity at the center of the beam that tapers off toward the edge of the beam. The intensity profile or distribution may vary depending on the operating mode and type of laser. For example, a helium-neon (He—Ne) laser used to provide one wavelength of red light generally produces a circular beam with a fundamental transverse mode ($TEM_{0,0}$) with an approximately radially symmetric Gaussian profile, while a neodymium:ytterbium-aluminum-garnet (Nd-YAG) laser used to provide a second wavelength of green light generally exhibits more of an elliptical beam with a Gaussian intensity profile that varies asymmetrically in the vertical and horizontal directions. The present disclosure recognizes that such non-uniform illumination of the HOE during recording may result in corresponding intensity variations or vignetting during playback of the HOE, i.e. the autostereoscopic image generated by the HOE appears brighter in the center of the screen and progressively darker around the edges.

One strategy for improving uniformity of illumination is to overfill the plate or screen during recording, which effectively captures the more uniform intensity near the center of the object and reference beams. This generally requires higher power lasers and associated optical components capable of accommodating the higher intensity beams. Alternatively, or in combination, longer exposure times may also be required, which are more susceptible to noise from vibrations or other environmental factors during exposure.

Another strategy for providing more uniform illumination is to use pulsed lasers to record a composite HOE having individual pixels that are each a separate hologram. This may provide various advantages relative to an HOE recorded in a single simultaneous exposure (or sequential exposures) with continuous wave (cw) lasers, such as allowing adjustments to be made on a pixel-by-pixel basis to provide a more uniform HOE from edge-to-edge. However, the pixel size and fill ratio or packing density limits the resulting resolution, which may not be acceptable for smaller screens for use in personal entertainment or gaming, or in more demanding applications where high resolution is desired, such as in medical imaging, for example.

In addition to high resolution, various applications may demand good color fidelity and preservation of aspect ratio so that viewed objects and distances are accurately depicted by the autostereoscopic display. For example, in medical imaging applications, a surgeon may rely on the color of tissue to distinguish between healthy and diseased tissue. Similarly, accurate manipulation of surgical tools demands little or no distortion in the images projected onto and by the HOE screen in the autostereoscopic display. Such requirements present additional challenges for autostereoscopic display systems, which may use various types of projectors to illuminate the HOE screen with the left-eye and right-eye images. Color fidelity may be affected by the wavelength(s) of the light source used by the projectors relative to the light sources used in recording the HOE, as well as the stability of the emulsion during developing and after mounting the HOE. Various types of image distortion or optical aberration induced by the projection optics, such as pincushion, barrel, or mustache, as well as keystone or tombstone effects created by positioning of the projectors at an angle relative to the HOE screen generally also need to be corrected. Depending on the particular projectors being used, some digital image correction may be provided, although this generally results in reduced resolution of the autostereoscopic system.

To maintain the three-dimensional image when viewing an autostereoscopic display, the left eye and right eye of the viewer must be aligned within corresponding viewing zones, eye boxes, or sweet spots of the display, and within a predetermined range or distance from the display, which depends on the particular type of screen and recording process used for the screen. To provide acceptable image contrast (corresponding to efficient light reflection/transmission to the eye boxes) generally requires eye boxes of fairly limited horizontal extent, which effectively limits viewer movement to maintain a three-dimensional image. Various strategies for eye tracking or head tracking have been developed to improve viewer mobility while maintaining alignment of the viewer's eyes with the eye boxes to maintain stereopsis and perception of a three-dimensional image.

SUMMARY

Systems and methods for creating an autostereoscopic three-dimensionally perceived image unaided by glasses or headgear include embodiments having a holographic optical element (HOE) recorded using coherent light of at least three wavelengths divided into a diverging reference beam and a diverging object beam that illuminate the HOE from opposite sides, the object beam passing through first and second diffusers with one diffuser being a directional diffuser to more uniformly illuminate the HOE during exposure. Various embodiments include one or more optic elements, such as a lens or telecentric beam expander(s), associated with a coherent source for at least one of the wavelengths to more closely match beam diameters of the at least three wavelengths. Similarly, anamorphic optics, such as an anamorphic prism pair, may be used for one or more light sources to better match beam profiles of the at least three wavelengths. In one embodiment, fixed optical baffles are positioned on opposite sides of the HOE with openings aligned proximate the reference beam and object beam paths, respectively, to reduce stray reflections and provide ambient air flow attenuation or damping. One or more edges of the HOE are masked to reduce or prevent stray light from entering and reflecting within the HOE during recording.

Various embodiments include a directional diffuser or homogenizer, which may have a desired eye box geometry, to improve transmission efficiency of the object beam. The directional diffuser may be implemented by a holographic element to transform an input beam having a Gaussian or other non-uniform intensity profile to more uniformly illuminate the HOE during the exposure period. The directional diffuser may have an illumination profile to improve conformance or mapping of the object beam to the aspect ratio of the HOE. The directional diffuser may be used in combination with a beam expander, implemented by an elongated cylindrical lens in one embodiment, and a second diffuser, implemented by a ground glass plate in one embodiment, positioned between the beam splitter and the HOE to provide more uniform illumination of the HOE by the object beam.

A method for creating an autostereoscopic three-dimensionally perceived image includes generating a polychromatic recording beam having at least three monochromatic coherent light components, separating the recording beam into an object beam and a reference beam, the object beam passing through at least one divergent element, a beam expander, and at least one diffuser having a desired eyebox geometry to illuminate a first side of a substrate coated with a panchromatic silver halide gelatin emulsion, the reference beam passing through at least one divergent element to illuminate a second side of the substrate during recording. The method may include modifying at least one beam property of at least one of the three monochromatic coherent light beams to match one or more beam properties or characteristics, such as beam waist or shape. In one embodiment, the method includes modifying a generally elliptical beam profile to a generally circular beam profile using an anamorphic prism pair. Embodiments may also include modifying one or more monochromatic or polychromatic beams to match beam waist diameters using corresponding optic elements, such as a telecentric beam expander or lens. In one embodiment, an elongated cylindrical lens is used to expand the object beam along an axis transverse to propagation prior to illuminating a ground glass diffuser. The object beam may be expanded to provide a desired object/reference beam intensity ratio, which may be between 1:4 and 1:7, for example. The method may also include modifying the aspect ratio of the object beam by passing through a directional diffuser before reaching the substrate. Similarly, the method may include blocking reflected light by masking edges of the substrate and/or positioning baffles proximate the divergent beam path of the reference and/or object beams.

Systems and methods for generating an autostereoscopic image include at least one projector having at least one light source with wavelengths substantially matched to the recording wavelengths of the HOE. In one embodiment, a stereo projector includes dual output lenses having central axes separated by a distance corresponding to a desired average intra-pupillary distance (multiplied by the ratio of the projector-screen/screen-viewer distance) of intended viewers. The stereo projector illumination sources are powered by a common power supply with passive convective cooling so that no cooling fan or other forced air cooling is required. In another embodiment, two substantially identical projectors are used. Projectors may include LED sources having peak wavelengths closely aligned or matched with the laser wavelengths used during recording of the HOE. In some embodiments, passbands of the HOE are modified by emulsion shrinkage. In one embodiment having recording wavelengths of 647 nm, 532 nm, and 476 nm, an LED projector includes closely aligned or substantially matched wavelengths of 637 nm, 518 nm, and 462 nm. Embodiments include projectors having optical keystone correction provided by a telecentric image plane projection lens system that may be supplemented with digital keystone, gamma, and/or other corrections provided by integrated electronics or an external image processing card, box, or similar device. The systems and methods according to various embodiments of the present disclosure project first and second substantially overlapping images onto a reflection HOE having a holographically recorded interference pattern captured within a single layer panchromatic photosensitive material during recording with at least one beam shaping device positioned in a reference beam and/or object beam path to improve uniformity of illumination and reduce or eliminate vignetting. The interference pattern captured in the photographic emulsion is produced by interference between mutually coherent object and reference beams of at least three lasers having wavelengths substantially corresponding to the illumination source of the at least one projector. The HOE illuminated by object and reference beams incident from opposite sides is then processed or developed and sealed to produces a reflection HOE screen illuminated from the viewing side by the at least one projector during use.

In one embodiment, simultaneous or sequential exposure of coherent light at three or more wavelengths during recording is used to provide desired color fidelity in the reflected images when illuminated by projectors having similar peak wavelengths during use as those coherent light sources used during recording. In one embodiment, the interference pattern is captured in a master holographic plate having a panchromatically sensitized ultra-fine particle silver halide gelatin emulsion deposited on a substrate (such as glass or triacetate film), which is subsequently chemically processed using a developing and rehalogenating bleaching process to convert silver atoms back to silver halide crystals to improve the efficiency of the resulting HOE while reducing or eliminating shrinkage of the emulsion and any associated shift in the replay wavelengths. In one embodiment, laser wavelengths used during recording do not match the projector wavelengths and the development process is controlled to provide a desired amount of emulsion shrinkage to better match or align the recording and replay wavelengths. The emulsion remaining after processing forms a desired master plate that may be used as the holographic element in the autostereoscopic display, and/or may be copied by known techniques (e.g. laser line scanning) to another glass or film substrate coated with a similar silver halide emulsion, or alternatively coated with a photopolymer, depending on the particular application and implementation.

Systems and methods for displaying and maintaining alignment of viewing zones of an autostereoscopic display relative to a viewer include an optical assembly suspended from a motor-controlled rotatable stage secured to a support arm extending from a riser. The optical assembly includes at least one illumination source that illuminates a viewing screen with generally coextensive left-eye and right-eye images to form corresponding left-eye and right-eye viewing zones within a predetermined range in front of the viewing screen. A controller in communication with the rotatable stage and in communication with a viewer sensor/detector controls rotation of the stage and suspended optical assembly relative to the support arm and riser in response to viewer movement to maintain alignment of the left-eye and right-eye viewing zones with the viewer.

An autostereoscopic display according to one embodiment of the present disclosure includes first and second projectors mounted behind a reflective holographic optical element screen with associated optical elements to provide substantially identical optical beam path lengths from the projectors to the corresponding left-eye and right-eye viewing zones. The optical assembly is secured to the rotatable stage such that the axis of rotation passes near or through the front surface of the HOE viewing screen. A first projector projects a left-eye image generally horizontally behind the screen to a first mirror that redirects the beam generally upward toward a second mirror. A second projector projects a right-eye image generally upward directly to the second mirror. The second mirror reflects the left-eye and right-eye images generally outward to a third mirror that reflects the images generally downward to co-illuminate substantially the entire front surface of the HOE viewing screen. The coextensively co-illuminated HOE viewing screen reflects light from the third mirror corresponding to the left-eye image to a left-eye viewing zone, and light corresponding to the right-eye image to a right-eye viewing zone. The viewer detector/sensor may be mounted on the optical assembly for rotation therewith, or may be mounted on the riser or another stationary structure, depending upon the particular application and implementation. A hood or shroud at least partially encloses the projectors, mirrors, and mounts. A plurality of light absorbing baffles or louvers may extend generally outward toward a viewer from the bottom edge of the viewing screen with a camera or other sensor/detector mounted generally in the center of the outermost baffle. In one embodiment, the optical assembly has a center of mass with a central axis extending near or through the rotational axis of the rotatable stage.

Systems and methods according to the present disclosure may include one or more adjustable mounting devices each having a single clamping device to releasably hold the mounting device in a desired position. In one embodiment, each mounting device includes a generally spherical pivot base having a slotted apex disposed between a complementary-shaped plano-convex mounting element having a threaded hole at its apex, and a complementary-shaped plano-concave clamping element having a hole at its apex. An adjustment bolt extends through the clamping element hole and the slotted apex of the pivot base into the threaded hole of the mounting element to releasably hold the mounting device in a desired position. The mounting device may be sized to accommodate various clamping forces and corresponding loads associated with the device being mounted. The mounting element may be integrally formed with a frame or base of the mounted device, or may be secured thereto. In one embodiment, each mirror of the optical assembly is secured to a corresponding adjustable mounting device with the mounting element integrally formed with the mirror frame. The mounting devices may be used to adjust the altitudinal and azimuthal angle of each mirror for coextensive co-illumination of the reflective HOE viewing screen with the left-eye image and right-eye image.

A method according to the present disclosure substantially coaxially aligns a center of mass of an optical system suspended from a rotatable stage of an autostereoscopic display with the center of rotation of the rotatable stage. The method may also include positioning the center of rotation of the rotatable stage in alignment with a front surface of a reflective viewing screen. The method may also include rotating the optical assembly in response to viewer movement to maintain alignment of a viewer with corresponding viewing zones of the autostereoscopic display.

Embodiments according to the present disclosure have various associated advantages. For example, embodiments that use a diverging reference and object beam eliminate the need for a spherical or parabolic concave mirror to illuminate the HOE during recording. Matching of beam waists and/or profiles of two or more coherent sources improves the system efficiency and may improve uniformity of illumination and color balance across the HOE for better color fidelity during playback. Masking of the edges of the HOE during recording reduces or eliminates artifacts associated with total internal reflection (TIR) of stray light entering the substrate during recording. Similarly, appropriately positioned baffles provide air damping and block stray reflections or other light during recording of the HOE. Use of an aperture in combination with a cylindrical lens and directional diffuser improves efficiency with better mapping of the object eyebox to the aspect ratio of the HOE.

Embodiments of the present disclosure provide real-time stereo images to corresponding eyes of at least one viewer to produce a three-dimensionally perceived image without viewing aids, such as glasses or headgear. Various embodiments according to the present disclosure provide real-time viewer position detection and image display synchronization to allow the viewer to move while staying within predetermined eye-boxes so that perception of the three-dimensional image is unaffected by viewer movement. Use of a reflection holographic element provides higher resolution and improves color fidelity of reflected images, both of which are desirable for a number of applications, such as medical imaging, video gaming, and personal entertainment devices, for example. Use of a beam shaping device in at least one of the reference and object beam paths during recording of a holographic optical element according to various embodiments of the present disclosure provides more uniform illumination to reduce or eliminate vignetting. Use of a directional diffuser rather than a ground glass plate or apodizer provides significant improvements in object beam efficiency.

The above advantages and other advantages and features will be readily apparent from the following detailed description of the preferred embodiments when taken in connection with the accompanying drawings.

BRIEF DESCRIPTION OF THE DRAWINGS

FIG. 1 is a block diagram illustrating a representative system or method for recording a holographic optical element for use in an autostereoscopic display according to embodiments of the present disclosure;

FIG. 4A illustrates a representative optical system having a beam shaping device and other optics to conform a generally circular beam with Gaussian energy profile to a generally rectangular screen with a more uniform or top-hat energy profile according to embodiments of the present disclosure;

FIG. 4B illustrates a representative optical system having two diffusers in the object beam path according to one embodiment of the present disclosure;

FIG. 8 is a block diagram illustrating a system or method for making a silver halide panchromatic emulsion used to coat a substrate for recording a holographic optical element according to embodiments of the present disclosure;

FIG. 9 is a block diagram illustrating a system or method for coating a substrate with a silver halide emulsion according to embodiments of the present disclosure;

FIG. 16 illustrates a projection lens with optical keystone correction for use in an autostereoscopic display according to embodiments of the present disclosure;

FIG. 17 illustrates a representative embodiment of a projector having optical keystone correction in an autostereoscopic display according to embodiments of the present disclosure;

DETAILED DESCRIPTION OF EMBODIMENT(S)

Figure 2A:
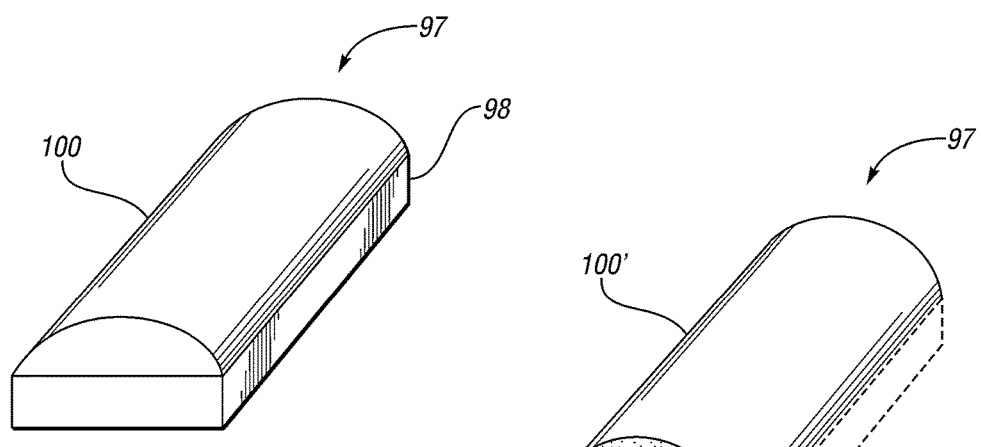
FIGS. 2A-2D illustrate representative diffuser geometries for a diffuser having suspended nanoparticles according to embodiments of the present disclosure.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to an autostereoscopic display system and method capable of displaying a stereo image in real-time using either live stereo video input, such as provided by a stereo camera, endoscope, etc., or a standard video input processed to generate simulated stereo video that is perceived as a three-dimensional image by one or more properly positioned viewers.

Referring now to FIG. 1, a block diagram illustrating a representative system or method for recording a holographic optical element for use in an autostereoscopic display according to embodiments of the present disclosure is shown. System 30 is separated into a first room 32 and second room 34 to provide isolation between at least one coherent light source 60 positioned on optical table or bench 40 from various recording optics positioned on table or bench 50. In this embodiment, rooms 32 and 34 have a common wall 36 with an opening or aperture 38 to accommodate a source beam 44. Optical table or bench 40 is positioned in first room 32 and is supported by a fluid suspension isolation system as indicated generally by reference numeral 42. Similarly, optics table 50 is positioned in second room 34 and is supported by a fluid suspension isolation system as indicated generally by reference numeral 52. In one embodiment, optics table 40 and optics table 50 are fluidly supported by a common fluid supply system as generally indicated by reference numeral 54. More particularly, optics table 40 and optics table 50 are each supported by four pneumatic isolation supports. Additional isolation may be provided by separating or isolation the building foundation of room 32 from the foundation of room 34, at least with respect to the foundation supporting optics tables 40 and 50. Positioning of laser sources 60 in a separate room 32 relative to the holographic optical element recording setup on optics table 50 in room 34 improves stability of the system during recording of the holographic optical element. In addition, the recording setup positioned on optics table 50 may be substantially contained within an enclosure 56 that includes an opening or aperture 58 adapted for receiving source beam 44. In one embodiment, enclosure 56 is implemented by open cell foam panels which surround and cover the recording setup during recording to reduce noise associated with dust or other particles suspended in the air and to dampen any acoustic vibrations.

Optics table 40 includes at least one coherent light source 60 generating light of corresponding first, second, and third recording wavelengths. In the embodiment illustrated in FIG. 1, coherent light source 60 includes lasers 62, 64, and 66. In this embodiment, laser 62 is implemented by an argon laser, with laser 64 implemented by a Nd:YAG laser, and laser 66 implemented by a krypton laser to provide recording wavelengths of 647 nm, 532 nm, and 476 nm. Depending upon the particular application and implementation, a single coherent light source may provide three or more recording wavelengths. Alternatively, one source may provide more than one wavelength with another source providing only a single wavelength, for example. Of course, various other types of coherent light sources or lasers and/or recording wavelengths may be used to generally align or substantially match the playback wavelengths of at least one illumination source used in an autostereoscopic display according to the present disclosure. Those of ordinary skill in the art will recognize that various lasing lines may be selected to provide desired recording characteristics with proper laser cavity design, use of etalons, etc.

As described in greater detail below, in one embodiment the recording wavelengths are closely aligned or substantially matched to wavelengths of 637 nm, 518 nm, and 462 nm of an LED projector in one embodiment. In another embodiment the 647 nm recording wavelength is replaced by a 660 nm recording wavelength. As described in greater detail herein, the projector(s) used in the autostereoscopic display may have a broadband illumination source that includes the recording wavelengths, such as a halogen or mercury lamp. However, this lowers the system efficiency and requires more power with associated heat generation due to the wasted energy in projecting light with wavelengths far away from the recording wavelengths. While this may be acceptable for some applications, many applications may benefit from reduced heat generation and wasted power, which may enable projector(s) having passive cooling to eliminate a cooling fan and associated noise, dust, and power. For example, medical applications may benefit from, or require, such performance characteristics where an autostereoscopic display is used in a clean environment, such as an operating room, for example.

In the embodiment illustrated in FIG. 1, coherent light from laser 62 is reflected by mirror 72 to beam combiner 76. Similarly, coherent light from laser 64 is reflected by mirror 72 to beam combiner 74, and coherent light from laser 66 is reflected by mirror 68 and mirror 80. Beam combiners 74 and 76 may be implemented by dielectric mirrors tuned or manufactured to reflect light of an associated coherent source wavelength while transmitting other wavelengths substantially without attenuation. Beam combiners 74 and 76 combine coherent light from light source(s) 60 into a source beam 44. A shutter 78 may be used to control the exposure time of the holographic optical element by selectively blocking source beam 44. Representative exposure times ranged between about 30-120 seconds.

Exposure H is defined as the incident intensity (E) times the time (t) of exposure of the recording material. If the intensity is constant during the whole exposure time, which is usually the case, then H=E*t.

In its general use, the term intensity indicates the flux per unit solid angle emitted by a light source. In photography, however, it is the amount of light radiation per unit area falling on an area or surface. Exposure can be expressed in both photometric and radiometric units. Photometric units apply to light only, where light means radiant energy within the visible part of the electromagnetic spectrum (400-700 nm). When exposure is expressed in photometric units, intensity refers to illuminance and exposure is then defined as Exposure=illuminance*time.

Illuminance is defined as luminous flux (or lumen) incident on an area or surface. The candlepower of the light source and the distance from the source to the recording material can be used to calculate the illuminance. Illuminance is generally expressed in lux (lumen/m$^2$) so the above formula yields the exposure in lux-seconds (lxs).

Radiation measured in radiometric units applies to radiation over the whole electromagnetic spectrum and is independent of the human eye. The radiometric equivalent of illuminance is irradiance, and exposure is then defined as Exposure=irradiance*time.

Irradiance is expressed in units of watts per square meter (W/m$^2$) so the exposure can be expressed in joules per square meter (J/m$^2$) or sometimes ergs per square centimeter (erg/cm$^2$) where 1 erg/cm$^2$=1 mJ/m$^2$. Holographic materials are usually characterized using radiometric units. The sensitivity of a holographic emulsion is most often expressed in μJ/cm$^2$ or, at times, in ergs/cm$^2$. (1 μJ/cm$^2$=10 erg/cm$^2$). Knowing the sensitivity of the material being used and measuring the irradiance at the recording position of the holographic optical element, the exposure time can be calculated using the above formula, i.e., Exposure time=sensitivity/irradiance During recording, source beam 44 passes through aperture 58 of enclosure 56 and is divided by beam splitter 90 into a reference beam 102 and an object beam 104. Beam splitter 90 may be an adjustable or fixed ratio beam splitter. In one embodiment, beam splitter 90 is a commercially available variable (adjustable) beam splitter available from Newport Corp. of Irvine, Calif. Model 50G02AV.2. In one embodiment, beam splitter 90 is selected or adjusted to provide a reference to object beam ratio of at least about 2:1 to limit intermodulation noise. In other embodiments, beam splitter 90 is selected or adjusted to provide a reference beam to object beam ratio of greater than 1:1 and may be in the range of between about 2:1 and 3:1, for example, to reduce or eliminate any halo or light ring forming around the eyebox being recorded on the holographic optical element, which is believed to result from intermodulation noise. The reference beam to object beam ratio should generally be less than 4:1 to inhibit formation of a self reference hologram in the recording medium.

Object beam 104 is reflected by mirror 92 through an optional beam shaping device 94 and a spatial filter and beam expander 96. In one embodiment, a three-axis spatial filter commercially available from Newport Corp. of Irvine, Calif., Model 900 (M-900) was used. The diverging beam illuminates a diffuser 97 to generally uniformly illuminate one side 110 of holographic optical element 112. As described in greater detail herein, element 112 is implemented by a substrate coated with a panchromatic material to capture an interference pattern during recording and as such is not actually a holographic optical element until recording and processing have been completed. However, element 112 is referred to as a holographic optical element throughout this description for consistency. Reference beam 102 passes through an optional beam shaping device 120 and spatial filter and beam expander 122. The diverging reference beam is reflected by an off-axis concave mirror 124 to form a converging reference beam having a focal point beyond holographic optical element 112 to generally uniformly illuminate a second side 114 of holographic optical element 112. As described in greater detail herein, holographic optical element 112 comprises a float glass or acetate film substrate having a single layer panchromatic photosensitive material coated on a recording surface. The panchromatic emulsion may comprise a silver halide gelatin emulsion containing at least one sensitizing dye for increasing sensitivity to at least one of the recording wavelengths. The single layer panchromatic emulsion may be deposited on a base layer of gelatin to improve adhesion of the photosensitive emulsion to the substrate.

In the representative embodiment of FIG. 1, concave mirror 124 is implemented by a spherical mirror, which provides acceptable results for a variety of sizes of holographic optical element 112. However, other applications may require a parabolic concave mirror to achieve desired performance characteristics, such as resolution, contrast, brightness, etc. of holographic optical element 112 when used in an autostereoscopic display. As illustrated in FIG. 1, concave mirror 124 is positioned at a recording angle 116 relative to holographic optical element 112. In one embodiment, recording angle 116 is about 45°. Recording angle 116 should substantially match the illumination angle or playback angle of holographic optical element 112 during use in an autostereoscopic display for best results.

Source beam 44 generally has a non-uniform energy distribution profile that may vary based on the particular type of coherent light source. For example, source beam 44 may be generally circular or elliptical with a Gaussian energy distribution profile. The present inventors have recognized that this may result in non-uniform illumination of holographic optical element 112 during recording, which results in a vignette effect during playback in the autostereoscopic display, i.e. images are brighter in the center and gradually become darker around the perimeter of the screen. Embodiments according to the present disclosure include a beam shaping device 94 or 120 positioned in at least one of the reference beam path 102 and object beam path 104 that transforms a generally Gaussian energy profile to a more uniform profile with a generally flat phase front to maintain the necessary coherence to create the interference pattern between the reference and object beams. Various types of beam shaping devices may be used as long as the phase of the beam is sufficiently preserved to maintain the coherence required to create an interference pattern at the holographic optical element 112 during recording. Beam shaping devices 94, 120 may be implemented by substantially similar devices, or by different devices, depending on the particular application and implementation. In one embodiment, only one beam shaping device 120 is used in the reference beam path and beam shaping device 94 is omitted. Representative examples of beam shaping devices are illustrated and described with reference to FIGS. 3-5.

As also illustrated in FIG. 1, diffuser 97 may be implemented by a ground glass plate 98 with a cylindrical lens 100 positioned between diffuser 97 and holographic optical element 112 to provide more uniform illumination of side 110 of holographic optical element 112. A cylindrical lens or plano-cylindrical lens 100 may be used alone or in combination with a beam shaping device 94. The present inventors have recognized that more uniform illumination of holographic optical element 112 by the reference and/or object beam will reduce vignetting of the autostereoscopic display and may be provided using various strategies as described herein. One strategy is to use a beam shaping device 94 to more uniformly illuminate the input side of diffuser 97. Another strategy is to compensate for non-uniformity of input illumination using cylindrical lens 100 and/or using a diffuser having suspended nanoparticles to randomly and uniformly scatter light passing through diffuser 97 to more uniformly illuminate holographic optical element 112. However, the use of a ground glass plate is generally less efficient than other strategies described herein. For example, typical ground glass plates may exhibit only 50-60% efficiency. As such, according to various embodiments of the present disclosure, diffuser 97 may be implemented by a directional diffuser or homogenizer, which may have an efficiency of between 85-92%, for example. The efficiency may be further improved by customizing diffuser 97 to direct light into a similar aspect ratio as holographic optical element 112 to minimize any overfill and associated wasted light energy. One such suitable homogenizer or directional diffuser is commercially available from Physical Optics Corp. of Torrance, Calif. These strategies may be used alone or in combination with strategies for providing more uniform illumination of side 114 of holographic optical element 112, such as use of a beam shaping device 120 as previously described, for example.

Optical elements arranged on table 50 are positioned such that object beam path 104 measured from beam splitter 90, to mirror 92, through optional beam shaping device 94, spatial filter and beam expander 96, and diffuser 97 to holographic optical element 112 is substantially equal to reference beam path 102. Reference beam path 102 is similarly measured from beam splitter 90 through optional beam shaping device 120, spatial filter and beam expander 122, to concave mirror 124 and holographic optical element 112. Any difference between the optical beam path lengths of the reference beam 102 and object beam 104 should be kept within the coherence length of the at least one coherent light source 60. In one embodiment, the difference between optical path lengths is within a few centimeters, for example, with the shortest coherence length of lasers 62, 64, and 66 of about 1 m.

FIGS. 2A-2-D illustrate representative diffuser geometries including a diffuser with a cylindrical lens and various diffusers having suspended nanoparticles according to embodiments of the present disclosure. As illustrated in FIG. 2A, diffuser 97 includes a generally planar ground glass plate 98 with a cylinder lens 100. In one embodiment, cylindrical lens 100 is a half-cylinder glass lens about one inch in diameter and about eight inches long. Ground glass plate 98 includes a ground flat surface and positioned between the glass plate 98 and cylindrical lens 100. In one embodiment, cylindrical lens 100 is in contact with ground glass plate 98. Various other embodiments have cylindrical lens 100 spaced from ground glass plate 98. Diffuser 97 has a geometry and size associated with a desired eyebox geometry and size. Cylindrical lens 100 may be made of a generally transparent material such as an acrylic, for example.

Figure 2B:
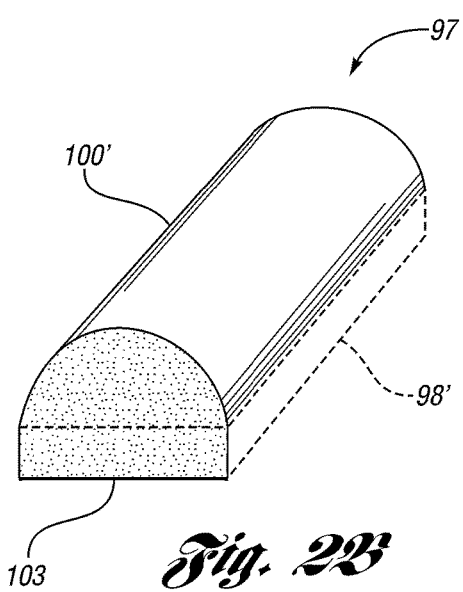

FIG. 2B illustrates a diffuser 97 made of a bulk material having randomly distributed suspended nanoparticles 103 with a scattering profile selected based on the recording wavelengths. Diffuser 97 may include a generally planar base portion 98' coupled to a half cylinder 100', for example. In one embodiment, diffuser 97 comprises an acrylic polymer having about 0.5% by weight of randomly distributed suspended particles 103 of titanium dioxide with a mean particle size of about 20 nm. In the embodiment illustrated in FIG. 2B, diffuser 97 includes a generally planar input surface with a cylindrical output surface. The particle concentration was empirically determined by testing different concentrations ranging between about 0.2-5.0% titanium dioxide by weight in glass cylinders (½" diameter) that were illuminated with a laser beam. The result of the illumination was observed on the opposite side of the sample with the goal of a concentration that resulted in a uniformly distributed output illumination. Higher concentrations provided uniform illumination but resulted in more significant beam attenuation, which is generally undesirable as this would require a higher beam power to achieve the desired reference beam to object beam ratio at the holographic optical element during recording and lowers system efficiency. As such, in one embodiment, a particle concentration of about 0.5% titanium dioxide by weight was selected with a bulk diffuser molded or cast with Polymed Polyol XR3002/PWK (54.0%) having titanium dioxide nanoparticles of 0.5% by weight added. Polymed Isocyanate (45.5%) was added and mixed for 5 minutes with the resulting material placed in a mold, cured at ambient temperature for 24 hours, then removed from mold and surface polished. A suitable nanoparticle titanium dioxide material is commercially available from Aldrich Chemical Corp. #718467 having 21 nm mean particle size based on ≥99.5% trace metals basis. Use of a bulk material with suspended particles as illustrated in FIG. 2B provides more uniform illumination of holographic optical element 112 than the diffuser of FIG. 2A, which relies on the surface scattering provided by ground glass plate 98.

Figure 2C:
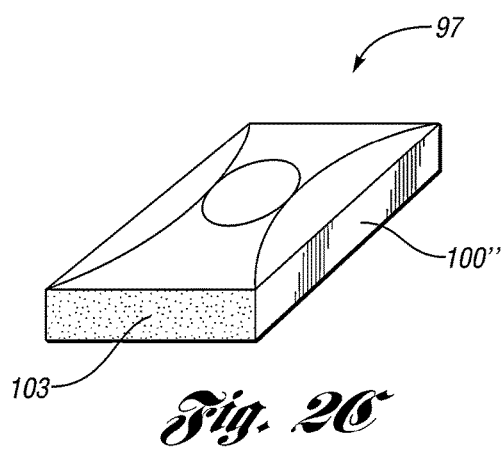
Figure 2D:
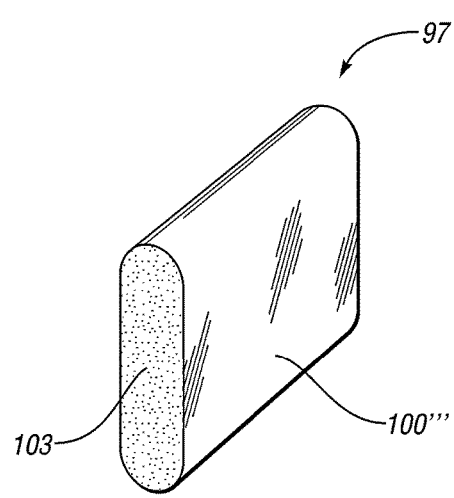

FIG. 2C illustrates another embodiment of a bulk diffuser 97 having suspended nanoparticles 103 according to the present disclosure. In the embodiment illustrated in FIG. 2C, diffuser 97 has a generally planar input surface and an ellipsoidal output surface. FIG. 2C illustrates an additional embodiment of a bulk diffuser 97 having suspended nanoparticles 103. In the embodiment of FIG. 2D, diffuser 97 includes a generally planar input and output surfaces with rounded edges to provide a generally oval cross-section. Of course, various other geometries may be used depending upon the particular application and implementation. However, the bulk diffusers having suspended nanoparticles are believed to transform the input beam into a plurality of Lambertian radiators such that the particular geometry has little effect on the resulting illumination profile.

Figure 3B:
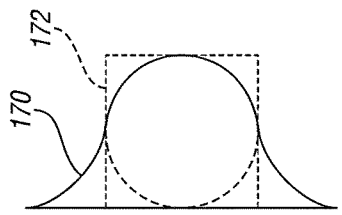
FIG. 3B illustrates an energy profile for a representative beam shaping device as illustrated in FIG. 3A.
Figure 3D:
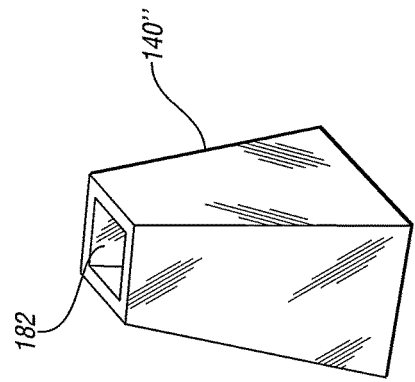
FIGS. 3C and 3D illustrate alternative embodiments of a beam shaping element for more uniform illumination of a holographic optical element during recording according to the present disclosure.
Figure 3A:
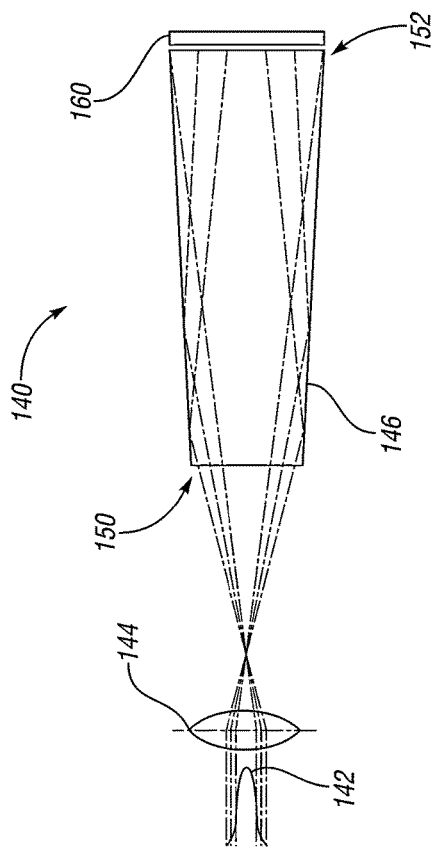
FIG. 3A illustrates a representative beam shaping device to provide more uniform illumination during recording of a holographic optical element according to embodiments of the present disclosure.

FIG. 3A illustrates a representative beam shaping device to provide more uniform illumination during recording of a holographic optical element according to embodiments of the present disclosure. Beam shaping device 140 may be used in at least one of the object beam path 104 and reference beam path 102 during recording of holographic optical element 112. Beam shaping device 140 operates on an input beam having a Gaussian profile 142 that passes through a positive lens 144 to focus the beam prior to entering input aperture 150. Beam shaping device 140 includes a reflective interior surface such that the diverging input beam reflects off the interior surface as it propagates through beam shaping device 140 toward exit aperture 152. When used in the object beam path 104, beam shaping device 140 may be positioned upstream relative to a diffuser 160 as previously described. When used in the reference beam path 102, diffuser 160 is omitted as illustrated and described with reference to FIG. 4. As illustrated in FIG. 3B, beam shaping device 140 may be used to transform a generally circular beam with a Gaussian energy profile 170 into a more uniform square beam with a top hat energy profile 172 by folding the energy contained in the wings of the Gaussian beam into the center of the beam.

Figure 3C:
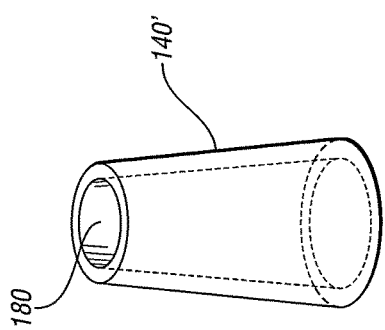

FIGS. 3C and 3D illustrate alternative embodiments of a beam shaping element as illustrated in FIG. 3A for providing more uniform illumination of a holographic optical element during recording according to the present disclosure. In the embodiment of FIG. 3C, beam shaping device 140' is implemented by a truncated cone having a reflective interior surface 180. As illustrated in FIG. 3A, beam shaping device 140 is positioned with a smaller input aperture 150 than output aperture 152. In the embodiment of FIG. 3D, beam shaping device 140" is implemented by a truncated pyramid having a reflective interior surface 182. As previously described, beam shaping device 140" is positioned with a smaller input aperture 150 than output aperture 152. The truncated pyramid illustrated in FIG. 3D may be implemented with a square or rectangular cross-section depending on the particular application and implementation.

FIG. 4A illustrates a representative optical system having a beam shaping device and other optics to conform a generally circular beam having a Gaussian energy profile to a generally rectangular holographic optical element with a more uniform or top-hat energy profile according to embodiments of the present disclosure. In input laser beam having a Gaussian energy profile is generally represented at 202. The input beam passes through a positive lens 204 that focuses the collimated beam two and associated focal point upstream relative to the input of beam shaping device 140. After the focal point, the beam diverges and enters beam shaping device 140, which may be implemented by a truncated cone or truncated pyramid as previously described. An additional achromatic positive lens 206 focuses the exiting beam which has a circular beam profile as indicated at 208 to a focal point aligned with a spatial filter or circular pinhole 210. The diverging beam passes through a second achromatic positive lens 212. The resulting collimated beam passes through a square beam shaping optic 214 that changes the beam from a generally circular profile to a square profile as indicated at 216. A cylindrical lens having horizontal power 218 may be used in combination with a cylindrical lens having vertical power 222 to conform the square beam profile to an associated aspect ratio of the holographic optical element being recorded as generally represented at 222. The expanded beam at 222 is then reflected off of concave mirror 124 positioned at the recording angle 116 to illuminate side 114 of holographic optical element 112 as previously described. Lens 218 and lens 220 may be combined into a single anamorphic optic to provide the desired mapping of the expanded beam to the aspect ratio of the holographic optical element.

FIG. 4B illustrates one embodiment of an optical system 230 for providing more uniform illumination by an object beam for a holographic optical element during recording according to the present disclosure. Object beam 232 passes through at least one beam expander 234 to a first diffuser 238 and a second diffuser 252 to holographic optical element 112 during recording. In the representative embodiment illustrated in FIG. 4B, object beam 232 has a generally circular cross-sectional profile as indicated at 235 incident on element 234, implemented by a half-cylindrical lens in this example. Cylindrical lens 234 expands beam 232 to a line or bar 236 incident on first diffuser 238, which is implemented by a ground glass plate in this example. Diffuser 238 produces a diffused source as generally represented at 250 on second diffuser 252. In the illustrated embodiment, diffuser 252 is implemented by a directional diffuser. Diffuser 252 may be masked with an opaque material to define a desired eyebox geometry as represented by the generally transparent or translucent aperture 254. In one embodiment, diffuser 252 is implemented by a holographic diffuser available from Physical Optical Corp. having a 35°×75° exit profile to more closely conform or match eyebox 254 to the aspect ratio of holographic optical element 112 as generally represented by diffused light 256. Some overfill of holographic optical element 112 may be tolerated, although this may require longer exposure times and lowers overall system efficiency.

The present disclosure recognizes that light entering along edges 255 of holographic optical element 112 may be subject to total internal reflection and may interfere with the reference and/or object beams during recording resulting in undesired artifacts. As such, various embodiments according to the present disclosure including masking of one or more edges 255 of holographic optical element 112 to reduce or eliminate light entering an edge of element 112. Masking may be performed by coating edges 255 with an opaque material, such as black paint, for example. The masking material should be selected so that it does not react with, or otherwise contaminate, the various post processing solutions that may be used to process element 112 after recording. Alternatively, or in combination, a temporary mask may be applied to holographic optical element 112 prior to recording and removed prior to post processing. For example, an opaque tape or similar material may be applied to edges 255 prior to recording and removed prior to post processing. Alternatively, or in combination, holographic optical element 112 may be secured within a fixture or mount that covers edges 255 to reduce or eliminate light from entering during recording.

Figure 5A:
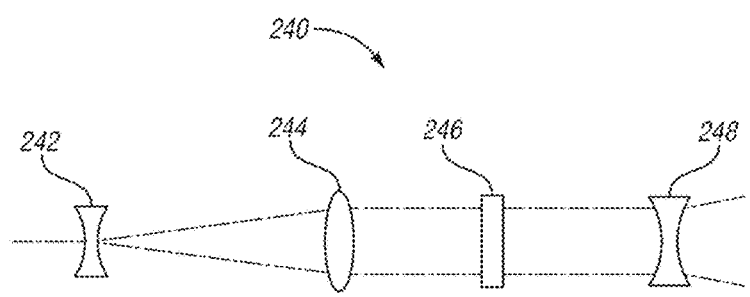
FIG. 5A illustrates another embodiment of a beam shaping device for more uniform illumination of a holographic optical element during recording according to the present disclosure.
Figure 5B:
FIGS. 5B-5E illustrate representative energy distribution profiles for an input beam and output beam for the beam shaping device of FIG. 5A.

FIG. 5A illustrates another embodiment of a beam shaping device 240 for providing more uniform illumination of a holographic optical element during recording according to the present disclosure. The system illustrated in FIG. 5A includes a negative lens 242 at the input with the diverging beam passing to a positive lens 244 with lens 242 and lens 244 operating as a telescope. The collimated beam passes through a beam shaping optic 246 to transform a generally Gaussian irradiance or intensity profile to an output beam having a generally uniform or top hat irradiance or intensity profile with a generally flat phase front. A second negative lens 248 is used to propagates the transformed output beam. Wave shaping device 240 may be used in either the reference beam and/or object beam path. In one embodiment, beam shaping device 246 is implemented by a commercially available optic element from Geola Digital, uab of Vilnius, Lithuania and is positioned in the reference beam path.

Figure 5C:
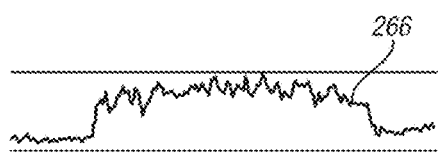
Figure 5D:
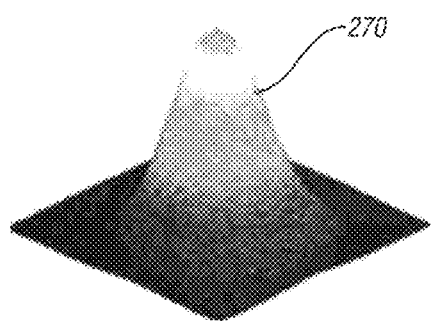
Figure 5E:
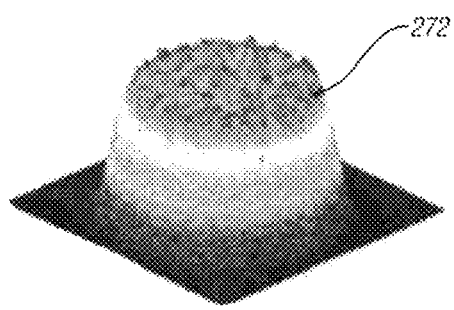

FIGS. 5B-5E illustrate representative energy distribution profiles for an input beam and output beam for the beam shaping device of FIG. 5A. Line 260 represents the input beam energy profile which is generally Gaussian-shaped. After passing through a beam shaping device 240, the output beam has a generally uniform energy profile as illustrated in FIG. 5C by line 266. This profile is sometimes referred to as a top hat profile. FIG. 5D represents a three-dimensional mapping 270 of the energy distribution profile of a representative input beam, which is generally Gaussian in three dimensions and radially symmetric about the optic axis. Similarly, FIG. 5D represents a three-dimensional mapping 272 of the energy distribution profile of the output beam having a more uniformly distributed energy density profile relative to the input beam Gaussian distribution.

Figures 6, 7:
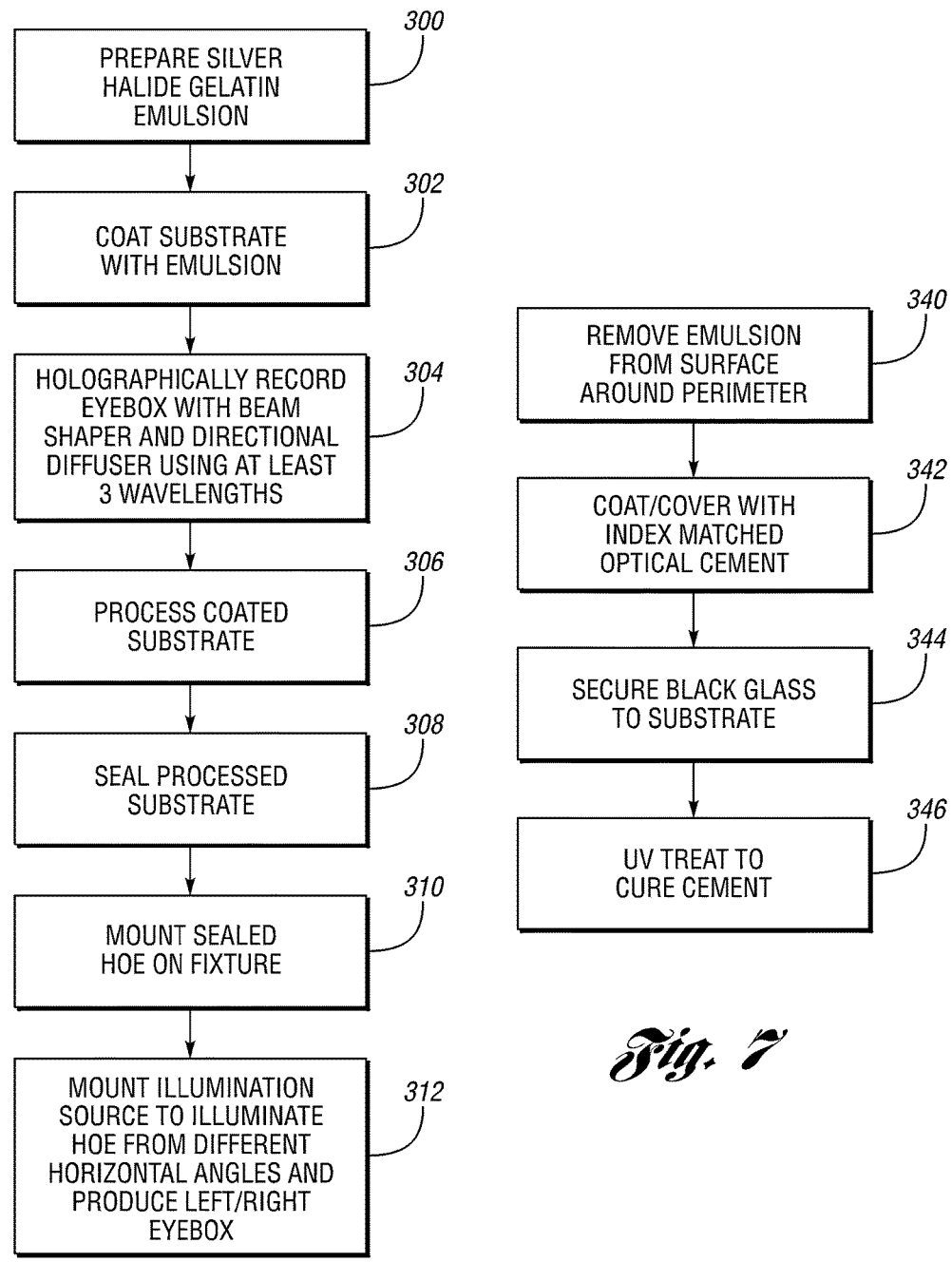
FIG. 6 is a block diagram illustrating a system or method for making an autostereoscopic display according to embodiments of the present disclosure.
FIG. 7 is a block diagram illustrating a system or method for sealing a holographic optical element after recording according to embodiments of the present disclosure.

FIG. 6 is a block diagram illustrating a system or method for making an autostereoscopic display according to embodiments of the present disclosure. The block diagrams of FIGS. 6-9 and 28 generally illustrate operation of a system or method for making an autostereoscopic display according to various embodiments of the present disclosure. The methods, systems, strategies, etc. illustrated may include various functions, elements, steps, and the like implemented or performed by one or more physical devices. Various steps or functions illustrated may be performed in the sequence illustrated, in parallel, or in some cases omitted. Although not explicitly illustrated, one or more of the illustrated steps or functions may be repeatedly performed. Similarly, the order of processing is not necessarily required to achieve the features and advantages described herein, but is provided for ease of illustration and description.

A method for making an autostereoscopic display according to various embodiments of the present invention includes making a holographic optical element by preparing a silver halide gelatin emulsion as represented by block 300. In general, a wide variety of materials have been used to capture/record a holographic interference pattern for subsequent use, such as photo-sensitive emulsions, photo-polymers, dichromated gelatins, and the like. The selection of a particular material/medium and corresponding recording process may vary depending upon a number of considerations. According to embodiments of the present disclosure, the photosensitive material is a nano-structured silver halide emulsion having an average grain size of about 10 nm, such as the commercially available GP-03C holographic plates, for example. Such film/emulsions/plates are commercially available from Sphere-s Co, Ltd. located in Pereslazl-Zalessky, Russia (www.holosphere.ru). In various embodiments, plates suitable for recording holographic optical elements according to the present disclosure have sensitivities of less than 2 mJ/cm$^2$ for the recording wavelengths to keep exposure time within a range that provides acceptable system stability. In one embodiment, commercially available plates from Sphere-S were used with the following sensitivity: blue~1.0-1.5*10$^{-3}$ J/cm$^2$; green~1.2-1.6*10$^{-3}$ J/cm$^2$, and red sensitivity~0.8-1.2*10$^{-3}$ J/cm$^2$.

Another suitable emulsion has been developed by the European SilverCross Consortium, although not yet commercially available. Similar to the GP-03C material, the emulsion developed by the European SilverCross Consortium is a nano-structured silver halide material with an average grain size of 10 nm in a photographic gelatin having sensitizing materials for a particular laser wavelength or wavelengths. In general, the finer the particles, the higher efficiency and better resolution in the finished screen, but the less sensitive the material is to a particular laser frequency, which results in a higher power density requirement and generally longer exposure times. The photo-sensitive emulsion may be sensitized using dyes during manufacturing to improve the spectral sensitivity during the recording process. Without any sensitizing dyes, the material is sensitive only to deep blue wavelengths.

As also illustrated, the method includes coating one side of a glass or acetate film substrate, for example, with the emulsion as represented by block 302. In one prototype display, a holographic plate including two optical quality glass pieces each having a thickness of about 3 mm (0.125 in.) and approximately 30 cm by 40 cm in size was used. A silver halide emulsion having an initial thickness of about 10-12 micrometers was applied to a triacetate substrate, followed by drying and cooling, and cutting to a final size, with the coated film placed between the glass plates. Other embodiments include direct coating of a glass or other rigid transparent substrate with the panchromatic silver halide emulsion as described in greater detail herein. After coating, the coated substrate should be kept in a temperate controlled environment of less than 8° C. for best results. Some coated substrates may require storage in a nitrogen environment depending on the particular materials and method used for preparing the silver halide emulsion and coating the substrate.

The method continues with holographically recording an eyebox on the coated substrate using at least three recording wavelengths of coherent light combined into a source beam as represented by block 304. The source beam is divided into a reference beam and object beam with at least one of the reference and object beams passing through a beam shaping device to substantially uniformly illuminate the substrate from opposite sides.

As also illustrated in FIG. 6, the method includes processing or developing the coated glass or film acetate substrate as represented by block 306. The coated substrate may be processed by hardening in a formaldehyde solution followed by developing with a catechol and urea solution and bleaching in a rehalogenating bleach solution as illustrated and described with reference to FIG. 10. After drying, the processed substrate may then be sealed or laminated as generally represented by block 308 with a representative sealing process described in greater detail with reference to FIG. 7. Sealing may include covering the coated side of the substrate with an optical cement and securing to a glass plate, for example. The method may also include mounting the sealed holographic optical element on a fixture suspended from a motor-controlled rotatable stage adapted to rotate the holographic optical element in response to movement of a viewer as represented by block 310. The method may also include mounting at least one illumination source that illuminates the holographic optical element with generally coextensive left-eye and right-eye images from substantially identical vertical angles (altitudinal) and different horizontal (azimuthal) angles to form corresponding left eye and right eye viewing zones within a predetermined range in front of the holographic optical element as represented by block 312. In one embodiment, the vertical angles are about 45° and the at least one illumination source comprises a projector having a projection lens system with optical keystone correction to project an image plane telecentric image onto the holographic optical element as described in greater detail herein.

FIG. 7 is a block diagram illustrating a system or method for sealing a holographic optical element after recording according to embodiments of the present disclosure. The holographic optical element is generally sensitive to temperature and humidity. Because the photosensitive emulsion is suspended in a dilute gelatin mixture, the emulsion side of the holographic optical element should be hermetically sealed or laminated to protect the recorded interference pattern and provide long-term stability of the performance characteristics of the autostereoscopic display. Various methods may be used to protect the photographic emulsion from changes in humidity, environmental contaminants, mold growth, etc. FIG. 7 provides a representative process that may be used according to one embodiment. Of course, various other methods may be used to seal the emulsion and protect it from environmental contamination, shrinking, swelling, and the like.

In the representative process illustrated in FIG. 7, emulsion is removed from the surface of the holographic optical element around the perimeter to provide a better sealing surface as represented by block 340. In one embodiment, emulsion is removed from a border area of about 3 mm wide around the perimeter. This assures that the edges of the emulsion are sealed and will not wick moisture. When still wet, the emulsion may be chemically removed or mechanically removed by scraping, for example. After drying, the emulsion is much more difficult to remove without damaging the substrate. The emulsion side of the substrate is then coated or covered with an index matched optical cement as represented by block 342. In one embodiment, a float glass substrate is used with a generally transparent optical cement having an index of refraction of about 1.5. The optical cement is curable by exposing to an ultraviolet light. After coating with the optical cement, a black glass plate is secured to the substrate as represented by block 344. Alternatively, the emulsion may be coated with flat black paint or a similar light absorbing substance and secured to a transparent glass plate or similar rigid material. The assembly is then treated with or exposed to ultraviolet (UV) light to cure the cement as represented by block 346. This is a similar method as used to protect Dichromated Gelatin (DCG) holograms with the emulsion side sealed to a glass plate, which is transparent for transmission holographic optical elements, or where black paint or black glass for reflection holographic optical elements as described herein.

In one embodiment, a 4 mm thick chromatic (RAL colored) black glass was used to seal the holographic optical element after recording. Vitralit 6127 optical cement was used to secure the black glass plate to the holographic optical element. This optical cement is a transparent fluid that dries clear, has a density at 20° C. of 1.12 g/cm$^3$, a viscosity of 20-100 mPas, contains 131-11-3 dimethyl phthalate, with a Urethanacrylat resin and a refractive index of 1.501.

FIG. 8 is a block diagram illustrating a system or method for making a silver halide panchromatic emulsion used to coat a substrate for recording a holographic optical element according to embodiments of the present disclosure. In contrast to silver halide emulsions used in photographic applications that encourage grain or crystal growth to increase photosensitivity, a holographic optical element for use in an autostereoscopic display according to embodiments of the present disclosure should have ultra fine grains of around 10 nm to produce acceptable results. While there are many thousands of different emulsion recipes in the literature, the basic reaction of a silver ion and a halide ion, i.e. chloride, bromide, and/or iodide is the same with the silver ion provided by silver nitrate ($AgNO_3$) and the halide ion typically provided by an alkali metal, such as potassium, sodium, or lithium. However, this reaction results in the silver halide precipitating out as large crystal aggregates if not properly controlled and is unsuitable for coating a holographic optical element. A dilute gelatin solution is used to act as a protective colloid that holds the silver halide crystals, is generally transparent, and provides various other beneficial properties as described in various published literature.

As illustrated in FIG. 8, one embodiment of a method for making a silver halide emulsion for coating a holographic optical element recorded according to the present disclosure includes simultaneously adding silver nitrate, potassium bromide, and potassium iodide to a dilute gelatin mixture of about 0.5% gelatin by weight as represented by block 360. The choice of gelatin and the solution concentration to use provides the desired physical properties as the binder and carrier for the silver halide particles as well as providing desired chemical and protective actions. In one embodiment, a gelatin concentration of 0.5% at precipitation was used, with subsequent water removal resulting in a concentration of about 2-3% for coating. One acceptable gelatin is the Rousselot39 de-ionized, photo type 250 LB gelatin.

The amount of silver and halide used affects the crystal size and basic sensitivity of the emulsion. Empirically determined values for silver concentrations of between about 0.1M and 0.15M per unit of emulsion produced clear, bright holographic optical elements with little or no noise. Other values resulted in hazing or noise and/or were darker than desired. Iodo-bromide crystals were produced to provide desired basic sensitivity (prior to sensitizing dyes) and spectral range relative to pure bromide with a ratio of iodide to bromide of between 0-10 mole %. The concentration ratio of silver to halide should also be controlled to avoid fogging and control crystal growth with a small excess of halide (around 5 mole %) present after precipitation for best results.

A double jetting method was used to simultaneously and continuously add the silver and halide salt solutions to the stirred dilute gelatin mixture. In one embodiment, synchronized peristaltic pumps were used to dispense the salt solutions with the dispensing rate determined to complete dispensing within about one minute. In addition, each salt is introduced at a different area or level of the mixture to encourage mixing with the dilute gelatin solution before encountering and reacting with the other salt. Dispensing rate is controlled and kept short to discourage crystal or grain growth, which otherwise contributes scattering and noise during playback of the holographic optical element. Solution temperatures are also controlled during mixing as the temperatures of the reactants directly affect the crystal size and crystal growth (ripening). The emulsion crystals are only nucleated with further growth or ripening inhibited or prevented by immediate and rapid cooling as represented by block 362. A gelatin solution temperature of between 32° C. and 38° C. with cool aqueous salt solutions was empirically determined to provide excellent results.

With continuing reference to FIG. 8, the method proceeds with dividing the mixture into smaller units or cells and freezing to form frozen units or cells as represented by block 362. In one embodiment, the emulsion was frozen in cells for 12-16 hours. The frozen cells are thawed at room temperature to remove excess water and increase the gelatin concentration as previously described by placing the cells in a sieve or similar device as represented by block 364. In one embodiment, frozen cells were allowed to thaw at room temperature of between 20° C.-24° C. for six to seven hours until all excess water was released and the emulsion formed a smooth cold jelly. The excess water also removes reaction by-products while increasing the gelatin concentration. The emulsion can then be refrozen for storage if desired.

The resulting emulsion is then heated in preparation for coating as represented by block 366. The basic emulsion is light sensitive to wavelengths up to around 500 nm. As such, spectral sensitizing cyanine dyes are added to broaden the spectral sensitivity to wavelengths up to around 670 nm. A gelatin hardening agent and other chemical sensitizers may also be added prior to coating to improve overall sensitivity as represented by block 368. The resulting emulsion with sensitizing dyes, gelatin hardening agent, and chemical sensitizers is then used to coat the selected substrate as described with reference to FIG. 9.

FIG. 9 is a block diagram illustrating a system or method for coating a substrate with a silver halide emulsion according to embodiments of the present disclosure. In the representative method illustrated in FIG. 9, the substrate is pre-coated with a dilute gelatin mixture to improve adhesion of the photosensitive emulsion as represented by block 370. In one embodiment, the dilute gelatin is a 0.5% by weight gelatin mixture that is applied to the substrate and allowed to dry prior to coating with the photosensitive emulsion. As previously described, the photosensitive silver halide emulsion is heated to provide desired flow characteristics for coating. One or more spectral sensitizing dyes, a gelatin hardener, and other chemical sensitizing materials may be added to the emulsion prior to coating. One side of the pre-coated substrate is then coated with the heated sensitized emulsion as represented by block 372. The coating may be performed manually by evenly spreading the emulsion over the substrate, or may be performed by a coating machine. The coated substrate is then allowed to dry as represented by block 374. In one embodiment, the coated substrate is allowed to dry at ambient temperature of about 20° C. and about 50% relative humidity for about 24 hours.

Figure 10:
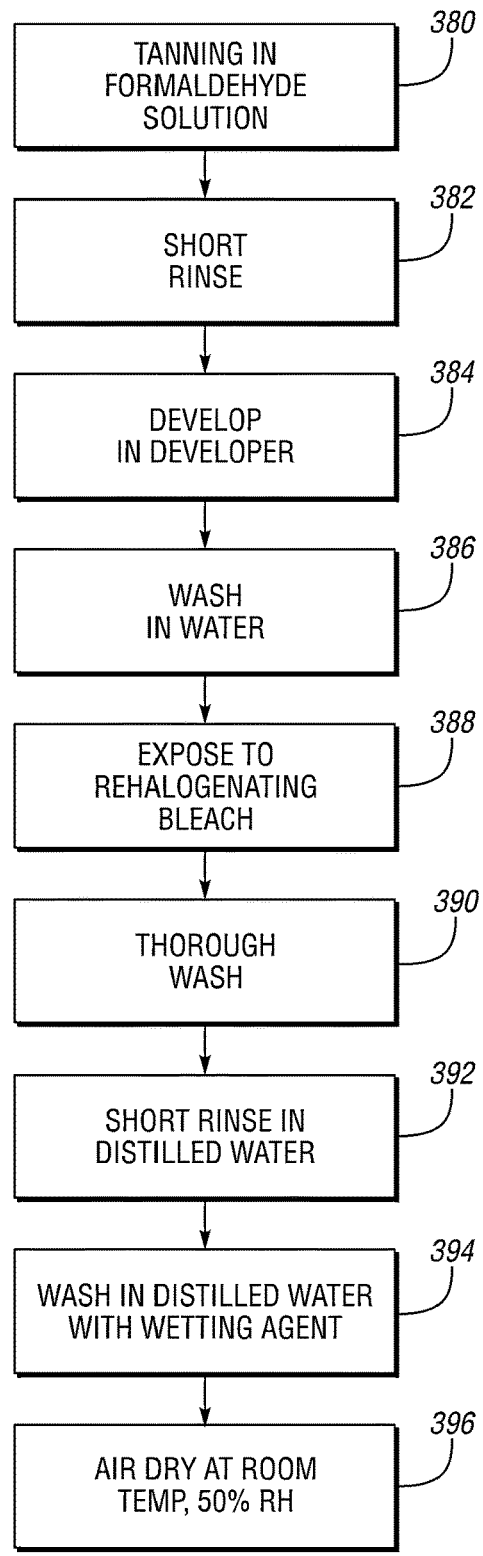
FIG. 10 is a block diagram illustrating a system or method for processing a holographic optical element after recording according to embodiments of the present disclosure.

FIG. 10 is a block diagram illustrating a system or method for processing a holographic optical element after recording according to embodiments of the present disclosure. The materials and methods used in processing the recorded holographic optical element may significantly impact the performance of the resulting holographic optical element in an autostereoscopic display. Emulsion shrinkage and other emulsion distortions caused by the active solutions used for processing should be avoided so that color aberrations are not introduced in the replay images. Shrinkage control is particularly desirable in applications where a master color holographic optical element is replicated using contact copying to a photopolymer or various other techniques. Because the emulsion is relatively soft, a hardening or tanning process is performed before development and bleaching as represented by block 380.

In one embodiment, the following bath is used for tanning or hardening of the emulsion as represented by block 380:

| Distilled water | 750 ml |
| Formaldehyde 37% (Formalin) | 10 ml (10.2 g) |
| Potassium bromide | 2 g |
| Sodium carbonate (anhydrous) | 5 g |
| Add distilled water to make | 1 l |

The substrate is immersed in the above bath or solution for about six minutes. The substrate is then quickly rinsed in water as represented by block 382 for about five seconds, and then immersed in an appropriate developer as represented by block 384. In this embodiment, the CW-C2 developer was used. The CW-C2 developer is a catechol-based developer that has demonstrated success in both monochrome and color holography applications. The use of urea increases the penetration of the developer into the emulsion. This facilitates uniform development of the recorded interference patterns throughout the emulsion thickness. Catechol also has a tanning effect on the emulsion with less staining as compared to pyrogallol. The CW-C2 developer may be formulated as follows:

| Distilled water | 750 ml |
| Catechol | 10 g |
| Ascorbic acid | 5 g |
| Sodium sulfite (anhydrous) | 5 g |
| Urea | 50 g |
| Sodium carbonate (anhydrous) | 30 g |
| Add distilled water to make | 1 l |

The substrate is placed in the developer at 20° C. for about three minutes and then washed in running water of about the same temperature for about five minutes as represented by block 386. The temperature of the developer has an influence on the final grain size in the emulsion, with lower temperatures generally resulting in smaller grain size. The temperature of all washing and processing solutions should generally remain the same, such as around 20° C., for example. Washing of plates with water that is too cold, such as around 10° C., for example, may result in non-uniform drying and may adversely affect the finished holographic optical elements.

A bleach bath is used to convert the developed silver hologram into a phase hologram as represented by block 388. The bleach creates an almost stain-free, clear emulsion substantially free from color distortion or filtering. In addition, as previously described, emulsion shrinkage may be controlled or limited to near zero shrinkage so that the image colors are not affected during replay. In some applications where the recording and replay wavelengths are not aligned or substantially matched, a prescribed amount of shrinkage may be induced during processing to shift the response of the emulsion to improve color fidelity of the resulting images.

In various embodiments according to the present disclosure, a rehalogenating bleach is used. The rehalogenating bleach is based on the idea of mixing a bleach solution by using an oxidation process between persulfate and a common developing agent, e.g., ascorbic acid, amidol, metol, and hydroquinone. These rehalogenating bleach baths have very good performance relative to both high efficiency and low noise, and some of them introduce little or no emulsion shrinkage. These bleaches are referred to as PBU (Phillips-Bjelkhagen Ultimate) bleaches followed by the name of the developing agent on which they are based.

In one embodiment, a metol-based rehalogenating bleach, PBU-metol was selected for the color processing and formulated as follows:

| | |
|---|---|
| Distilled water | 750 ml |
| Cupric bromide | 1 g |
| Potassium persulfate | 10 g |
| Citric acid | 50 g |
| Potassium bromide | 20 g |
| Add distilled water to make | 1 l |

After the above mentioned chemicals have been mixed, add 1 g metol [$(HOC_6H_4NHCH_3)_2 \cdot H_2SO_4$]

The bleach can be diluted for use after a few minutes of being mixed. This allows sufficient oxidation of the developing agent metol. One part stock solution is diluted with one part distilled water for use. A representative bleaching time is about five minutes. However, the time may vary depending on the particular bleaching solution, emulsion, and various other factors. The process is continued until the plate appears clear. After the bleaching process, the plate is washed or rinsed for at least five minutes and up to 10 minutes in this example as represented by block 390. This is followed by a short rinse of about one minute in distilled water as represented by block 392, followed by a wash in distilled water with a wetting agent as represented by block 394. The plate is then dried at room temperature of about 20° C. and 50% relative humidity as represented by block 396.

Washing and drying processes are controlled to provide a desired amount of shrinkage of the emulsion so that the replay wavelengths substantially correspond to the recording wavelengths. As previously described, little or no shrinkage may be desired in applications where the projector illumination source or sources closely match the recording laser wavelengths. Other applications may use some desired amount of emulsion shrinkage to shift the replay wavelengths to better match those of the replay projector(s).

Figure 11:
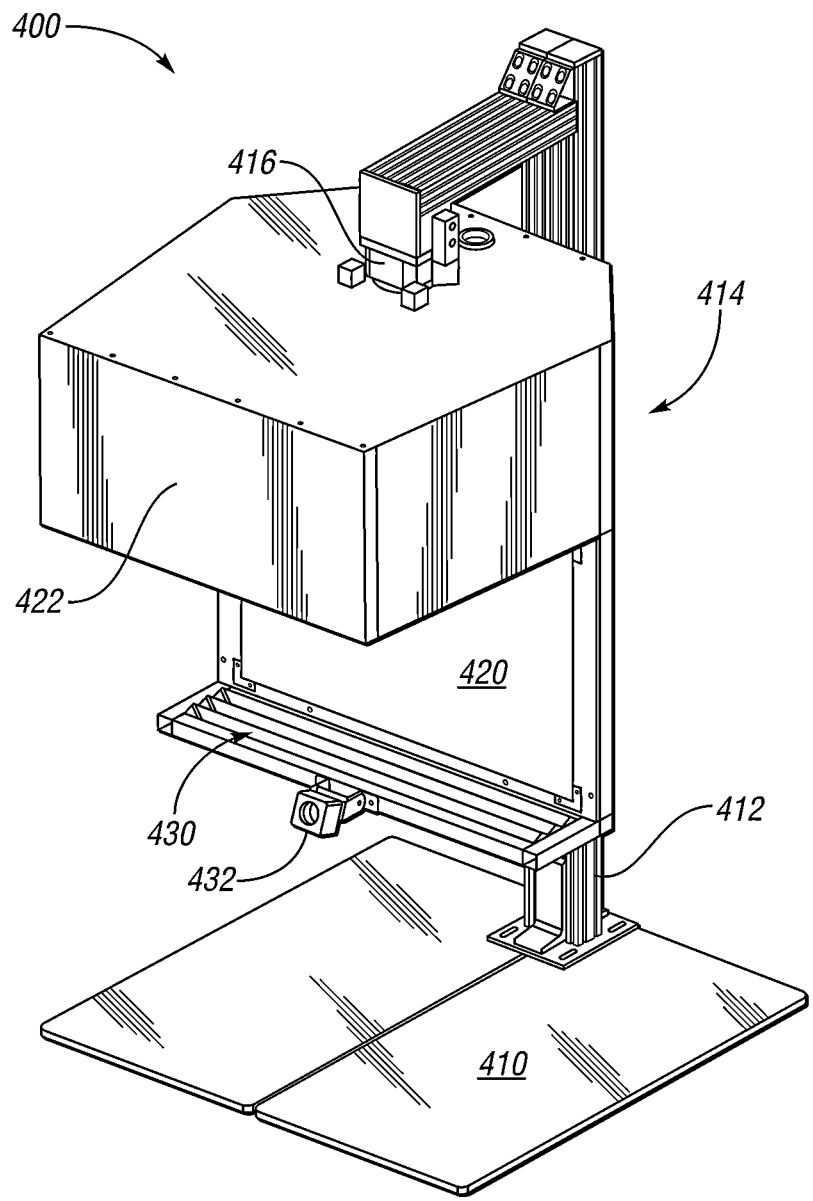
FIG. 11 is a perspective view of a representative embodiment of an autostereoscopic display having an illumination source and holographic optical element screen suspended from a rotary motor controlled stage according to the present disclosure.
Figure 13:
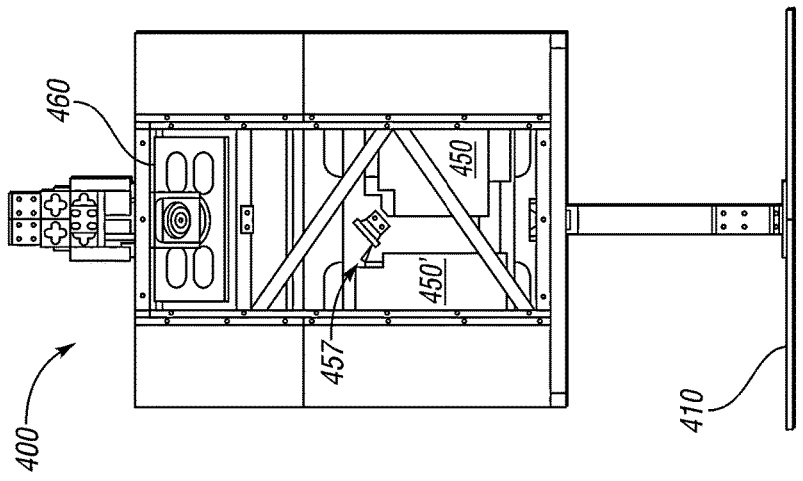
FIG. 13 is a back view of the representative embodiment of an autostereoscopic display as illustrated in FIG. 10.
Figure 12:
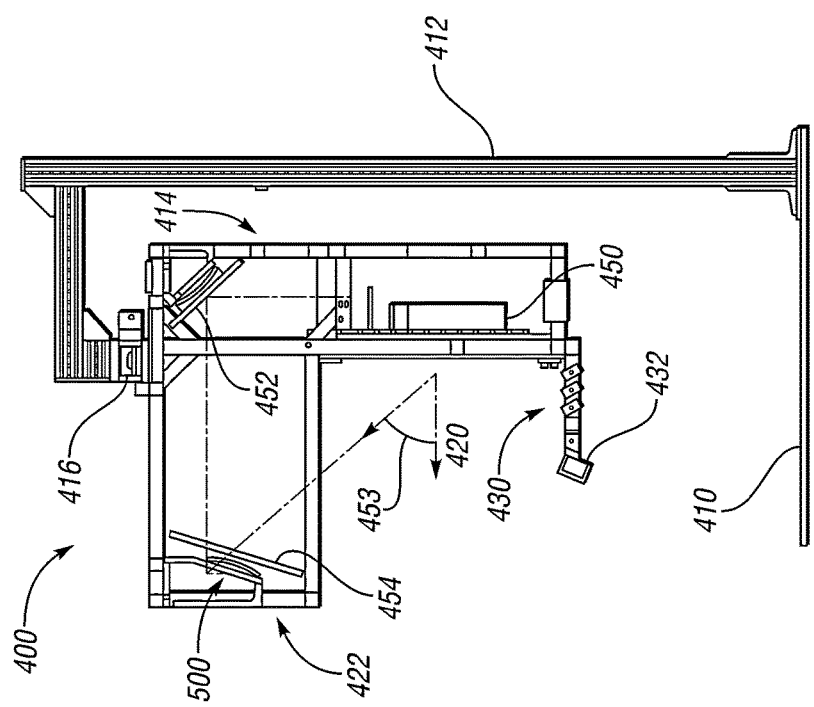
FIG. 12 is a side view of the representative embodiment of an autostereoscopic display as illustrated in FIG. 10.

FIG. 11 is a perspective view of a representative embodiment of an autostereoscopic display having an illumination source and holographic optical element screen suspended from a rotary motor-controlled stage according to the present disclosure. Autostereoscopic display system 400 includes a base plate or platform 410 with a fixture or riser 412 mounted thereto. A motor-controlled rotatable stage 416 is mounted to fixture 412. Holographic optical element 420 is secured to frame 414 which is secured for movement with rotatable stage 416. Holographic optical element 420 includes an eyebox recorded in a single layer panchromatic emulsion exposed to at least three wavelengths of coherent recording light combined in a source beam divided into a reference beam and an object beam to provide a reference to object beam ratio of at least about 2:1. A desired reference/object beam ratio may be provided by adjusting or selecting an appropriate beam splitter. Alternatively, or in combination, a desired ratio may be obtained by expanding the object beam more than the reference beam and overfilling the holographic optical element with at least the object beam. At least one of the reference and object beam paths may include a beam shaping device to substantially uniformly illuminate holographic optical element 420 during recording as previously described. As best illustrated in FIGS. 12 and 13, frame 414 includes at least one illumination source 450, 450' secured for movement with the rotatable stage 416. The at least one illumination source 450, 450' illuminates holographic optical element 420 with light corresponding to the at least three recording wavelengths from two different angles to form generally coextensive left-eye and right-eye images within corresponding left-eye and right-eye viewing zones within a predetermined range in front of holographic optical element 420. Holographic optical element 420 and at least one illumination source 450, 450' are secured via frame 414 to rotatable stage 416 such that an axis of rotation of rotatable stage 416 passes substantially through a front surface of holographic optical element 420. Various components may also be mounted so that the center of mass is closely aligned with the center of rotation.

As previously described, the replay wavelengths generated by the at least one illumination source 450, 450' may be closely aligned or substantially match the recording wavelengths used in recording holographic optical element 420 to enhance image brightness and contrast while maintaining color fidelity and reducing or eliminating color aberration. As demonstrated by the previously described examples, all of the recording wavelengths do not need to be identical to all of the playback wavelengths generated by the at least one illumination source 450, 450', but should be closely aligned, such as within about 20 nm, for example. System performance and efficiency generally improve with closer alignment of more of the wavelengths used for recording and playback.

Autostereoscopic display system 400 also includes a plurality of light baffles 430 that absorb any stray light. A viewer sensor 432 may also be provided to generate a signal in response to movement of a viewer. The signal generated by sensor or camera 432 is used to control movement of rotatable stage 416 and holographic optical element 420 to maintain alignment of the left eye and right eye viewing zones with the viewer. A representative method for viewer eye tracking or head tracking and control of rotatable stage 416 is illustrated and described with reference to FIG. 22, for example.

FIG. 12 is a side view and FIG. 13 is a back view of the representative embodiment of an autostereoscopic display as illustrated in FIG. 11. As illustrated in FIGS. 11-13, at least one illumination source 450, 450', implemented by two commercially available projectors in this representative embodiment, is mounted within frame 414 behind holographic optical element 420. Light from projector 450' is projected generally horizontally from behind holographic optical element 420 and redirected by a corresponding first mirror 457 to a second mirror 452 secured by a fixed mount 460. Second mirror 452 redirects the beam to a third mirror 454 secured by an adjustable mount 500 such that the projected light illuminates holographic optical element 420 at a replay angle 453 that substantially matches the previously described recording angle. In the embodiment illustrated in FIG. 12, the replay angle 453 is about 45°. Second projector 450 projects a right-eye image generally upward directly to second mirror 452 and third mirror 454. As such, second mirror 452 reflects the left-eye and right-eye images generally outward to third mirror 454, which reflects the images generally downward to co-illuminate substantially the entire front surface of holographic optical element 420. First and second projectors 450', 450 are positioned to provide substantially equal optical path distances to holographic optical element 420. As such, a plurality of optical elements, implemented by mirrors 452, 454, 457 in this embodiment, is positioned to direct light from projectors 450, 450' to holographic optical element 420 and provide substantially identical optical beam path lengths from first and second projectors 450, 450' to holographic optical element 420. Second mirror 452 and/or third mirror 422 may be positioned using an optical mount 500 illustrated and described with reference to FIGS. 14-15. Optical mount 500 provides adjustment about two axes of rotation with a single fastener to secure the mount in a desired position.

In an alternative embodiment, projectors 450, 450' may be positioned such that they are coaxially aligned along a common optic axis as illustrated and described with reference to FIG. 21 to provide substantially equal optical path distances to holographic optical element 420.

Figure 14:
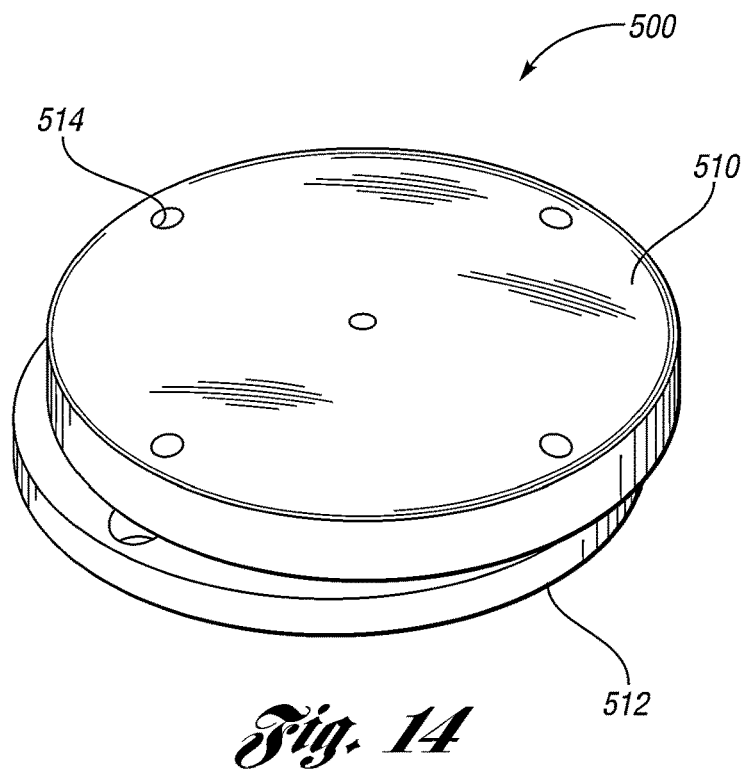
FIG. 14 is a perspective view of an optical mount for an autostereoscopic display according to embodiments of the present disclosure.
Figure 15:
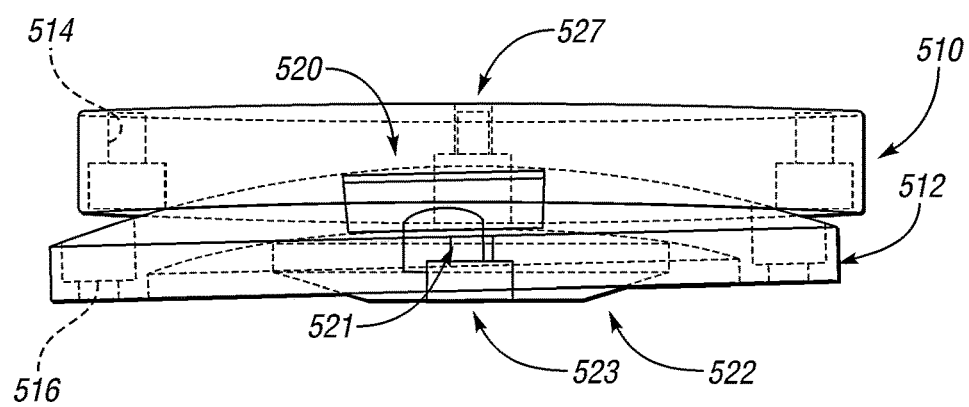
FIG. 15 is a front view of an optical mount for an autostereoscopic display according to embodiments of the present disclosure.

FIGS. 14-15 illustrate an adjustable optical mount for an autostereoscopic display according to embodiments of the present disclosure. Adjustable mount 500 provides adjustments about two axes of rotation. As such, a mirror may be secured via fasteners 514 to mount 500 so that an azimuthal angle and altitudinal angle may be adjusted. Once adjusted, the mount is secured with a single clamping device 522 that releasably holds the adjustable mount in a desired position. As shown in FIGS. 14-15, adjustable optical mount 500 includes a generally spherical pivot base 512 having a slotted apex 520. A complementary-shaped plano-concave clamping element 522 having a hole at its apex 521 is used with a corresponding fastener extending into mounting element 510 to clamp mounting element 510 in position relative to base 512, which may be secured to a fixture, frame, etc. via fasteners 516. In the embodiment illustrated, mount 500 includes an adjustment bolt 523 extending through hole 521 of clamping element 522 and the slotted apex 520 of pivot base 512 into a threaded hole 527 of mounting element 510 to releasably hold mounting device 500 in a desired position.

FIG. 16 illustrates a projection lens with optical keystone correction for use in an autostereoscopic display according to embodiments of the present disclosure. As previously described, for best performance the recording angle and playback angle should be the same. In the illustrated embodiments, a recording and playback angle of about 45° is used. Projection of an image onto the holographic optical element at an angle using conventional projectors may result in various types of image distortion or optical aberration induced by the projection optics, such as pincushion, barrel, or mustache, as well as keystone or tombstone effects. Depending on the particular projectors being used, some digital image correction may be provided, although this generally results in reduced resolution of the autostereoscopic system. As such, various embodiments of the present disclosure incorporate a projection lens assembly 550 to provide optical keystone correction to enhance resolution while maintaining a desired aspect ratio between the images captured by stereo cameras and the images reflected by the autostereoscopic display to create the three-dimensional image for the viewer(s). Of course, optical keystone or tombstone correction may be used alone or in combination with various digital image processing to further enhance various image attributes including brightness, contrast, gamma, etc.

As illustrated in FIGS. 16 and 17, projection lens assembly 550 projects an image from display 560 with an active display height indicated at 562 through a first wedge 564, relay optics 570, an aperture stop 572, field lens assembly 574, and second wedge 576. The projection lens design illustrated in this embodiment provides an f/2.5 system using a 25 mm display diagonal for active display 560. Lens assembly 550 has a back focal length of greater than 30 mm, which could be reduced with a smaller active display 560. In one embodiment, first wedge 564 is replaced with a beam splitter or cube. Projection lens assembly 550 provides optical keystone correction while projecting an image of active display 560 at a vertical or altitudinal angle 580 of about 45° in this embodiment. Projection lens assembly 550 may be used in combination with various projector electronics and power supply within a corresponding projector housing or enclosure 602. Projector 602 may be designed to provide passive convective cooling so that no cooling fan is required. Projector 602 is fixed relative to holographic optical element 604 as generally represented by boom 610 at replay angle 580. Projector 602 may be mounted with lens assembly 550 generally perpendicular to holographic optical element 604. Projection lens assembly 550 is a telecentric image plane system.

Figure 18:
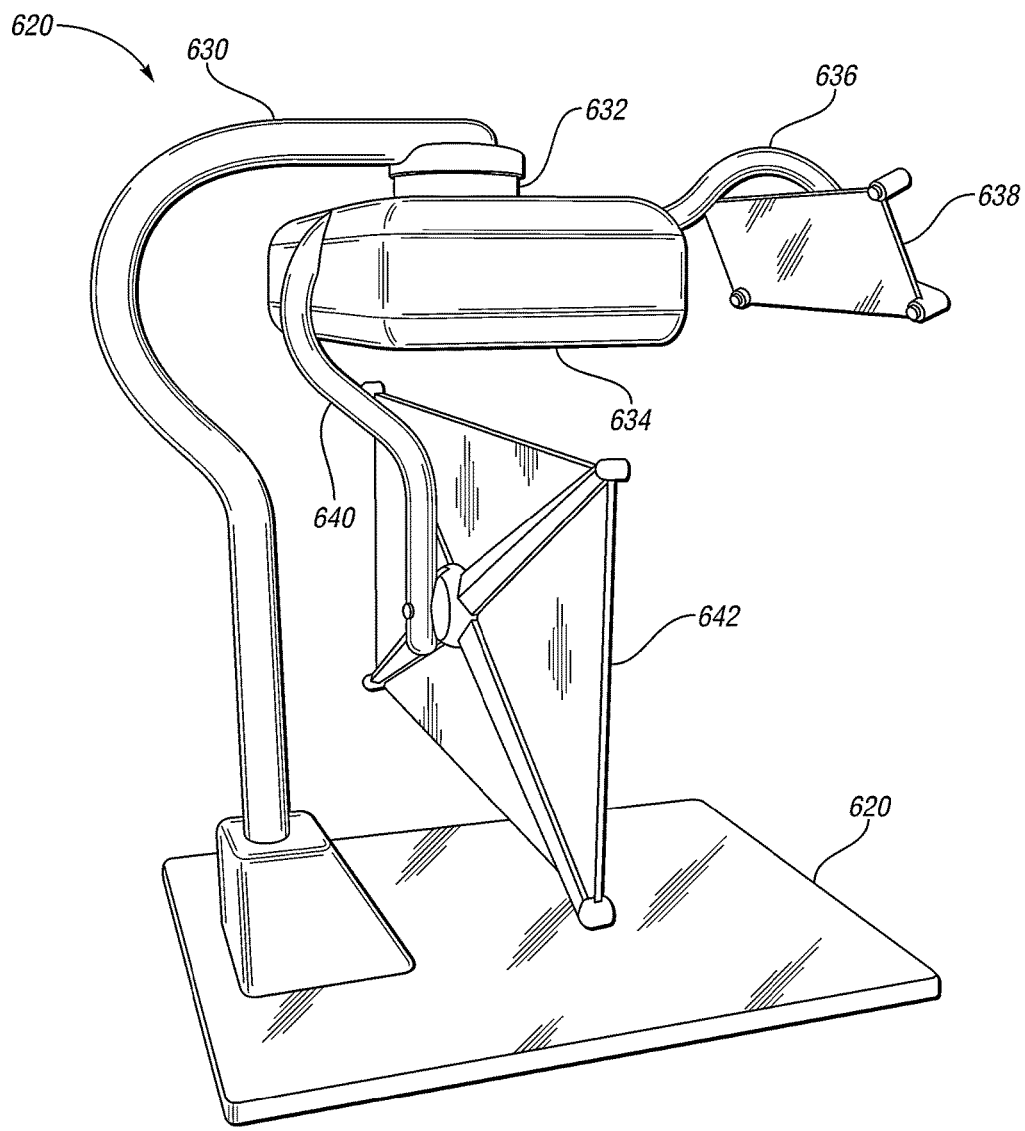
FIG. 18 is a perspective view illustrating an embodiment of an autostereoscopic display having a holographic optical element and at least one illumination source suspended from a motor controlled rotary stage according to the present disclosure.

FIG. 18 is a perspective view illustrating an embodiment of an autostereoscopic display having a holographic optical element and at least one illumination source suspended from a motor controlled rotary stage according to the present disclosure. System 620 includes a base platform 620 with a riser 630 fixed thereto. A motor-controlled rotary stage 632 is secured to riser 630 and illumination source enclosure 634 to control relative rotation therebetween to provide viewer eye/head tracking as described in greater detail with respect to the representative embodiment of FIG. 22. A folding mirror support arm 636 and associated mirror mount positions folding mirror 638 relative to enclosure 634. A screen support arm 640 is secured to enclosure 634 and secures holographic optical element 642 for rotation with enclosure 634 and motor controlled rotary stage 632.

As illustrated in FIG. 18, holographic optical element 642 is secured for movement with rotatable stage 632. As previously described, holographic optical element 642 has an eyebox recorded in a single layer panchromatic emulsion exposed to at least three wavelengths of coherent recording light. Enclosure 634 includes at least one illumination source, such as a pair of projectors or a stereo projector, for example, secured for movement with rotatable stage 632. During operation, the at least one illumination source that illuminates holographic optical element 642 via folding mirror 638 with light corresponding to the at least three wavelengths of recording light from two different horizontal angles to form generally coextensive left-eye and right-eye images within corresponding left-eye and right-eye viewing zones within a predetermined range in front of holographic optical element 642.

As also illustrated in FIG. 18, a method according to one embodiment of the present disclosure includes mounting holographic optical element 642 on a fixture 640 suspended from a motor controlled rotatable stage 632 adapted to rotate holographic optical element 642 in response to movement of a viewer as described in greater detail with respect to FIGS. 19-22. The method also includes mounting at least one illumination source, such as contained within an enclosure 634, that illuminates holographic optical element 642 with generally coextensive left eye and right eye images. Holographic optical element 642 is illuminated from different horizontal angles to form corresponding left eye and right eye viewing zones. In this embodiment, holographic optical element 642 is positioned such that an axis of rotation of rotatable stage 632 passes through a front surface of holographic optical element 642.

FIGS. 19-22 illustrate a representative embodiment of a medical imaging application for an autostereoscopic display having a holographic optical element recorded according to embodiments of the present disclosure. Those of ordinary skill in the art will recognize that an autostereoscopic display according to the present disclosure may be used in a wide variety of applications including various video gaming, entertainment, advertising, etc. and is not limited to medical applications. However, medical applications may have performance requirements related to resolution, color fidelity, noise, brightness, contrast, etc. that may be uniquely satisfied by an autostereoscopic display incorporating a holographic optical element according to the present disclosure.

Figure 19:
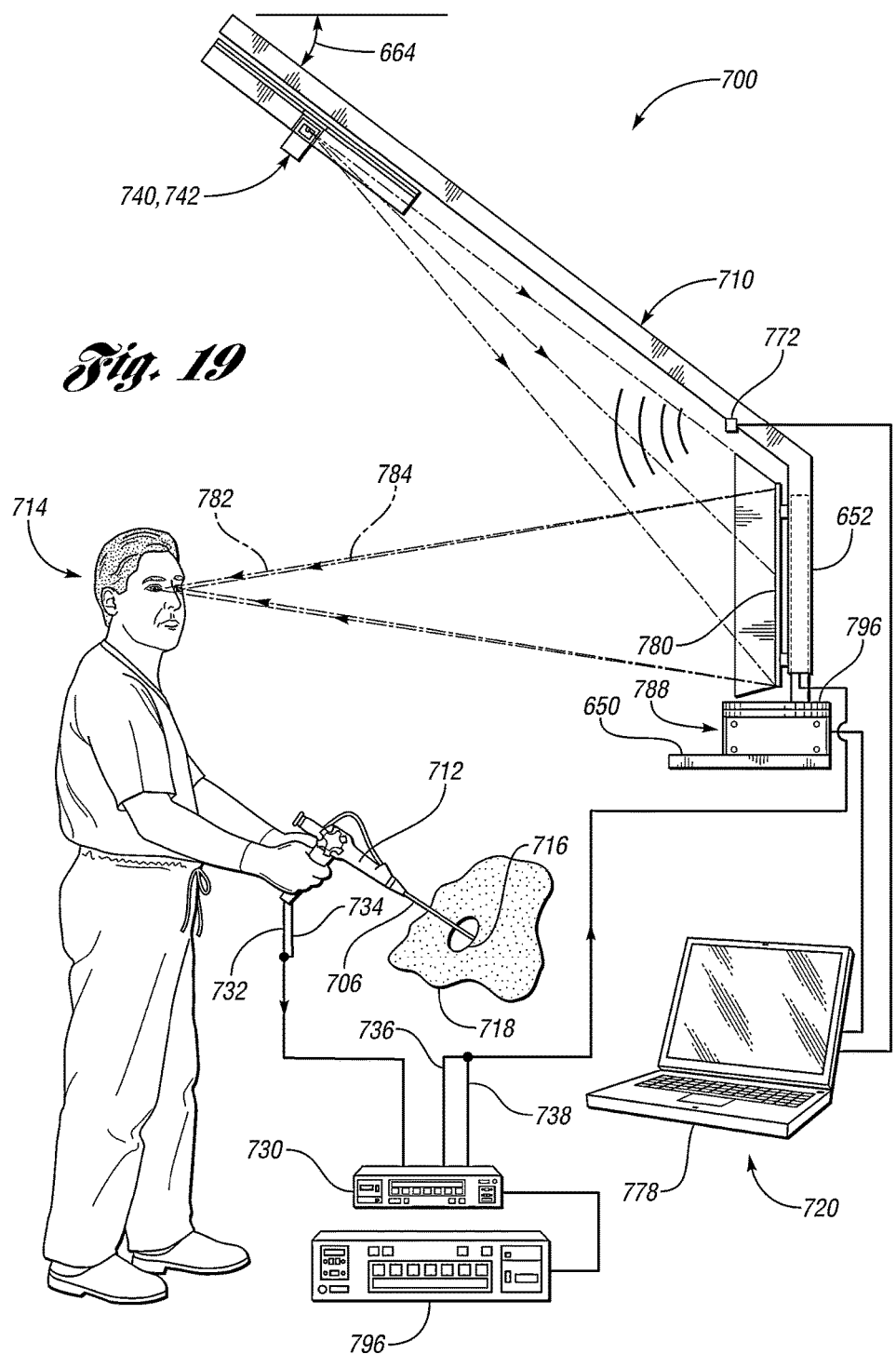
FIG. 19 is a block diagram illustrating a representative embodiment of an autostereoscopic display having a holographic optical element recorded according to embodiments of the present disclosure.

FIG. 19 schematically illustrates a system or method for producing a three-dimensional image via a reflection holographic optical element of an autostereoscopic display recorded, processed, and sealed according to embodiments of the present disclosure. Apparatus 700 includes a display system 710 for projecting an autostereoscopic image captured from a stereo endoscope 712 so that user 714 perceives a three-dimensional image of the interior of a cavity 716 of a body 718 or other object unaided by special glasses or optical headgear. Stereo endoscope 712 may provide left video 732 and right video 734 to a video processor 730, or directly to display system 710, depending on the particular application and implementation. Video signal processor 730 may combine or encode the stereo video signals into a multiplexed signal for display on a local or remote auxiliary screen (not shown) and/or for recording on a recording device 796, such as a VCR, DVD, or DVR, for example.

In one embodiment, video processor 730 is implemented by a stereo encoder/decoder commercially available from 3-D ImageTek Corp. of Laguna Niguel, Calif. and combines the two stereo input signals into a single field-multiplexed output video signal, or vice versa. Video signal processor 730 may also include a pass-through mode where video feeds 732, 734 pass through to output feeds 736, 738 without any signal multiplexing, but may provide noise filtering, amplification, or other digital image processing functions, for example, between the stereo inputs and corresponding stereo outputs.

As also shown in FIG. 19, stereo video output signal lines 736, 738 are provided to at least one illumination source implemented by two associated projectors 740, 742 (best shown in FIGS. 2-3) of display system 710 in this embodiment. Projectors 740, 742 project corresponding images in real-time to focus substantially co-extensive overlapping images on a reflection holographic optical element 780. Holographic element 780 is sometimes referred to as a "screen" even though the resulting three-dimensional image perceived by the viewer may appear in front of and/or behind the element. As previously described, holographic optical element 780 includes an eyebox that reflects light projected thereon from projector 740 to a first viewing zone 782 and light projected thereon from projector 742, positioned at a different horizontal angle, to a second viewing zone 784. When viewer 714 is properly positioned, each eye will see only one of the images of a corresponding viewing zone. The slightly different perspective provided by each image (also known as horizontal parallax) is combined by the visual processing of the viewer's brain and the viewer perceives a three-dimensional image of the interior of cavity 716 as captured by a stereo imaging system within tube 706 of stereo endoscope 712.

In the embodiment illustrated in FIGS. 19-22, display system 710 includes a fixed base 50 having the base 792 of a computer-controlled actuator 788, which includes a rotary stage 796 in this embodiment, secured thereto. In this embodiment, a riser/boom assembly 652 is secured to rotary stage 796 of actuator 788 to provide eye/head tracking as described herein. Reflective holographic element 780 is secured directly or indirectly to riser and boom 652 such that it is generally vertically positioned. An optional viewing shield 54 surrounds the perimeter of reflection holographic optical element 780 and extends generally outward toward viewer 714, with each side forming an obtuse angle with the plane of reflection holographic optical element 780 to provide a desired field of view. Projectors 740, 742 are directly or indirectly secured to boom 652. In one embodiment, projectors 740, 742 are secured to a mounting plate 656, which is secured via posts 658 and cover 668 to boom 652. In this embodiment, boom 652 forms an altitudinal angle 664 of about 38 degrees. However, the desired angle may vary based on the recording angle used to produce element 780 as previously described and generally known in the holographic optical element art. In general, it is desirable to project light from projectors and any associated optic elements at an altitudinal angle of about 45 degrees below horizontal with the boom angle adjusted accordingly based on the particular optics and mounting plate arrangement.

System 700 may also include a head tracking subsystem 720 that synchronizes or aligns movement of viewer 714 with reflection holographic element 780 and projectors 740,742 to maintain alignment of the stereoscopic viewing zone corresponding to the left-eye viewing zone 782 and right-eye viewing zone 784. Head/eye tracking subsystem 720 may include a computer controller actuator 788, implemented by a rotary stage in this embodiment, to move viewing zones 782, 784 in response to movement of viewer 714. In the embodiment illustrated in FIG. 19, means for moving viewing zones 782, 784 includes means for moving display system 710, which includes projectors 740, 742 and associated optics secured to mounting plate 656, which in turn is secured to boom 652. Of course, other types of actuators may be used alone or in combination to provide up to six degrees of freedom, depending upon the particular application and implementation, i.e. the means for moving display system 710 may be implemented by a single or multi-axis microprocessor controlled actuator 788. In the embodiment illustrated, the means for moving projectors 740, 742 and reflection holographic optical element 780 corresponds to actuator 788, which includes a base, stepper motor, and rotary stage with the stepper motor and controller commanded by control logic or software executed by a computer 778. The means for detecting movement of viewer 714 may include computer 778, which communicates with the motor/controller associated with actuator 788 and an infrared sensor/camera 772. Computer 778 generates commands to rotate stage 796 in response to changes in position of viewer 714.

Figure 20:
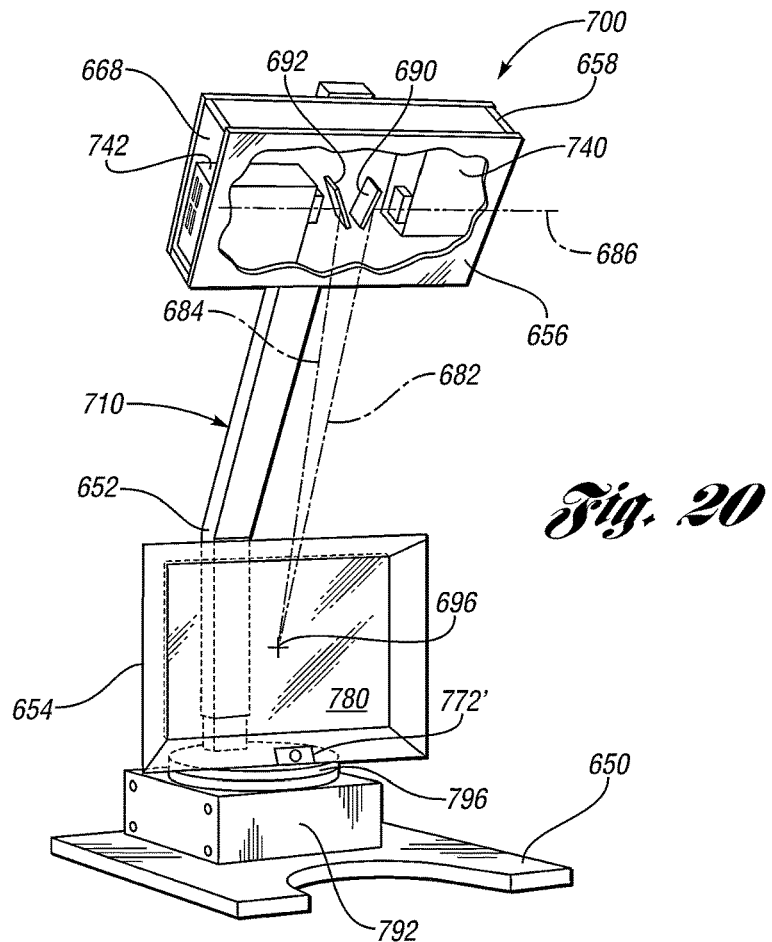
FIG. 20 is a cutaway view illustrating projector positioning for use in various embodiments of an autostereoscopic display according to the present disclosure.

Infrared camera/sensor 772, 772' may be mounted on boom 652 above screen 780 as shown in FIG. 19, or below screen 780 as shown in FIG. 20, for example. In one embodiment, camera/sensor 772 is a commercially available camera employing a CMOS sensor sensitive in the near-IR region, such as the Firefly MV digital camera available from Point Grey Research (ptgrey.com). The camera is positioned to capture a facial image of viewer/observer 714 with the image processed by facial recognition software to detect eye/head movement and control the eye/head tracking actuator 788 as described in greater detail with respect to FIG. 22.

Figure 21:
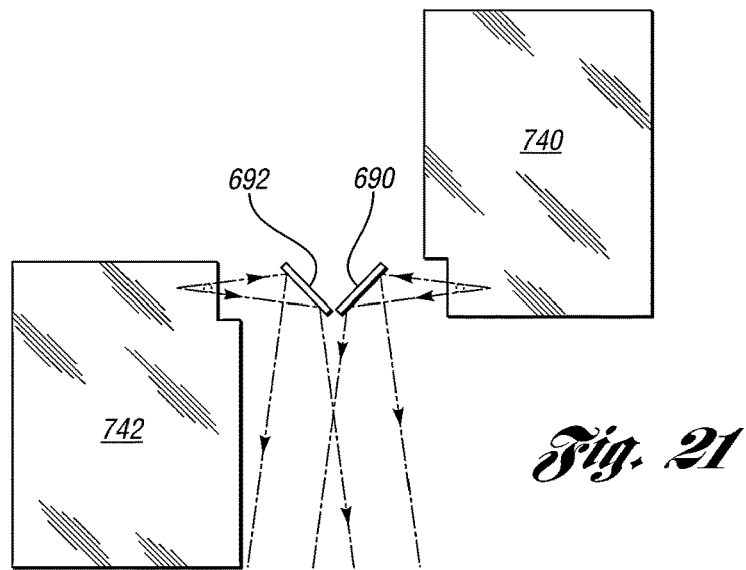
FIG. 21 is a diagram illustrating projectors having axially aligned outputs according to various embodiments of the present disclosure.

FIGS. 20 and 21 illustrate positioning of projectors 740, 742 and associated optics for one embodiment of an autostereoscopic display using a reflection holographic optical element according to the present disclosure. In the illustrated embodiment, projectors 740, 742 are implemented by commercially available projectors, such as the CASIO XJ-557 available from Casio Computer Co., Ltd., or similar projectors. These projectors incorporate a DLP projection system with a 210 W high-pressure mercury lamp and can provide a XGA resolution of 1024×768 pixels. These also include various embedded digital image processing for color correction, focusing, and digital keystone correction functions that may be used for various image adjustments so that the images projected on reflection holographic optical element 780 are substantially rectangular and co-extensive or completely overlapping with right-angle corners to provide desired color fidelity and image registration between the left and right images seen by viewer 714. As previously described, use of a broadband illumination source, such as a mercury or halogen lamp for example, generally results in wasted power because holographic optical element 780 reflects only those wavelengths closely aligned with the recording wavelengths. As such, in one embodiment, projectors 740, 742 are implemented by LED projectors having illumination source wavelengths that are more closely aligned with the recording wavelengths to improve system efficiency and enable use of passive cooling. Additional efficiency may be obtained by using a stereo projector with a common power supply and associated electronics. Of course, the selected projector characteristics may vary depending upon the particular application and implementation.

As generally illustrated in the perspective view of FIG. 20, projectors 740, 742 are secured to mounting plate 656 in an offset arrangement, best illustrated in the plan view of FIG. 21, such that central principal rays of the images output by projectors 740, 742, respectively, are coaxially aligned along a common axis and propagate in opposite directions. The coaxially projected rays corresponding to a first image projected from first projector 740 and a second image projected from second projector 742 are redirected by associated first mirror 690 and second mirror 692, which are also secured to mounting plate 656, preferably by an adjustable mount. In the illustrated embodiment, mirrors 690, 692 are implemented by commercially available first-surface aluminum coated float glass optical quality mirrors with reflection in the visible wavelengths of 90-95%, for example. Mirrors 690, 692 are positioned to align the first and second images to co-illuminate the reflective holographic optical element 780 from different horizontal or azimuthal angles such that the central axis or principal rays 682, 684 from the first and second images intersect or substantially overlap at element 780 at a known calibration point 696, which is positioned near the center of element 780 in this embodiment.

As will be appreciated by those of ordinary skill in the art, light projected from projectors 740, 742 and reflected from mirrors 690, 692 exits at substantially the same altitudinal angle (out of the plane of the paper) based on the angle of boom 652 and mounting plate 656 relative to the output lenses of the projectors. However, projectors 740, 742 and/or mirrors 690, 692 are positioned such that the incident azimuthal angle of light projected on reflection holographic element 780 is slightly different so that element 780 reflects the light to a selected light box or viewing zone based on the angle of incidence. The reflection holographic element 780 performs angle selectivity so that ideally only the light incident from the first projector is reflected to the first viewing zone and only light incident from the second projector is reflected to the second viewing zone even though both the first and second images co-illuminate element 780. Of course, in practice various factors may contribute to some light from the first projector being diffracted to the second viewing zone and vice versa, which is undesirable and degrades the quality of the three-dimensional image perceived by observer 714.

In various embodiments, holographic optical element 780 is a reflection or reflective holographic optical element that may be recorded and processed using holographic techniques as described herein to improve uniformity of illumination during recording and reduce or eliminate vignetting during playback.

The illustrated embodiment of system 700 incorporates a reflective element 780 with light from at least two projectors 740, 742 propagating from generally above element 780 and being diffracted by element 780 to corresponding left/right viewing zones 782, 784 to create the image perceived as a three-dimensional image by viewer 714. Element 780 functions to diffract incident light from first projector 740 positioned at a first azimuthal angle of incidence relative to element 780 to a first viewing zone 782. Likewise, light from second projector 742 positioned at a second azimuthal angle of incidence relative to element 780 is projected onto element 780 and is diffracted toward a second viewing zone 784. A viewer 714 properly positioned in front of display device 708 at the viewing "sweet spot" sees only the left image 782 with the left eye and the right image 784 with the right eye. If the left image and right images are appropriately shifted one relative to the other, i.e. contain an appropriate amount of horizontal parallax, the viewer's brain combines the left and right images and the viewer 714 perceives a three-dimensional image. The horizontal parallax provides the third dimension or depth to the image, which appears in front of, within, or spanning the plane of element 780. The position of the perceived image relative to the viewing element can be controlled by appropriate positioning of the holographic plate used to create element 780 during the holographic recording process as known in the holography art. If viewer 714 moves out of the "sweet spot", the three-dimensional effect is at least partially lost and viewer 714 no longer perceives a three-dimensional image.

To reduce or eliminate loss of the three-dimensional image, head tracking system 720 attempts to synchronize movement of viewing zones 782, 784 with movement of viewer 714 to maintain alignment of a viewer's eyes with the "sweet spot" or stereoscopic viewing zone of the display. Although numerous other head/eye tracking strategies are possible, the strategy illustrated and described herein rotates the entire display system 710, which is secured to riser/boom 652, in response to viewer movement.

As previously described, the left and right video signals provided to the left and right projectors may be captured in real-time by corresponding left and right cameras, which may be positioned within an endoscope, to provide appropriate parallax. Alternatively, the left and right video signals may be generated by or modified by a video signal processor, such as processor 730 or the like, that processes a standard format video input signal captured by a single camera (two-dimensional) to create a stereo left/right output signal provided to the left/right projectors by adding horizontal parallax to the left/right video output signals. As another alternative, either or both of the left/right video input signals could be based on images generated entirely by computer, i.e. CG images.

Figure 22:
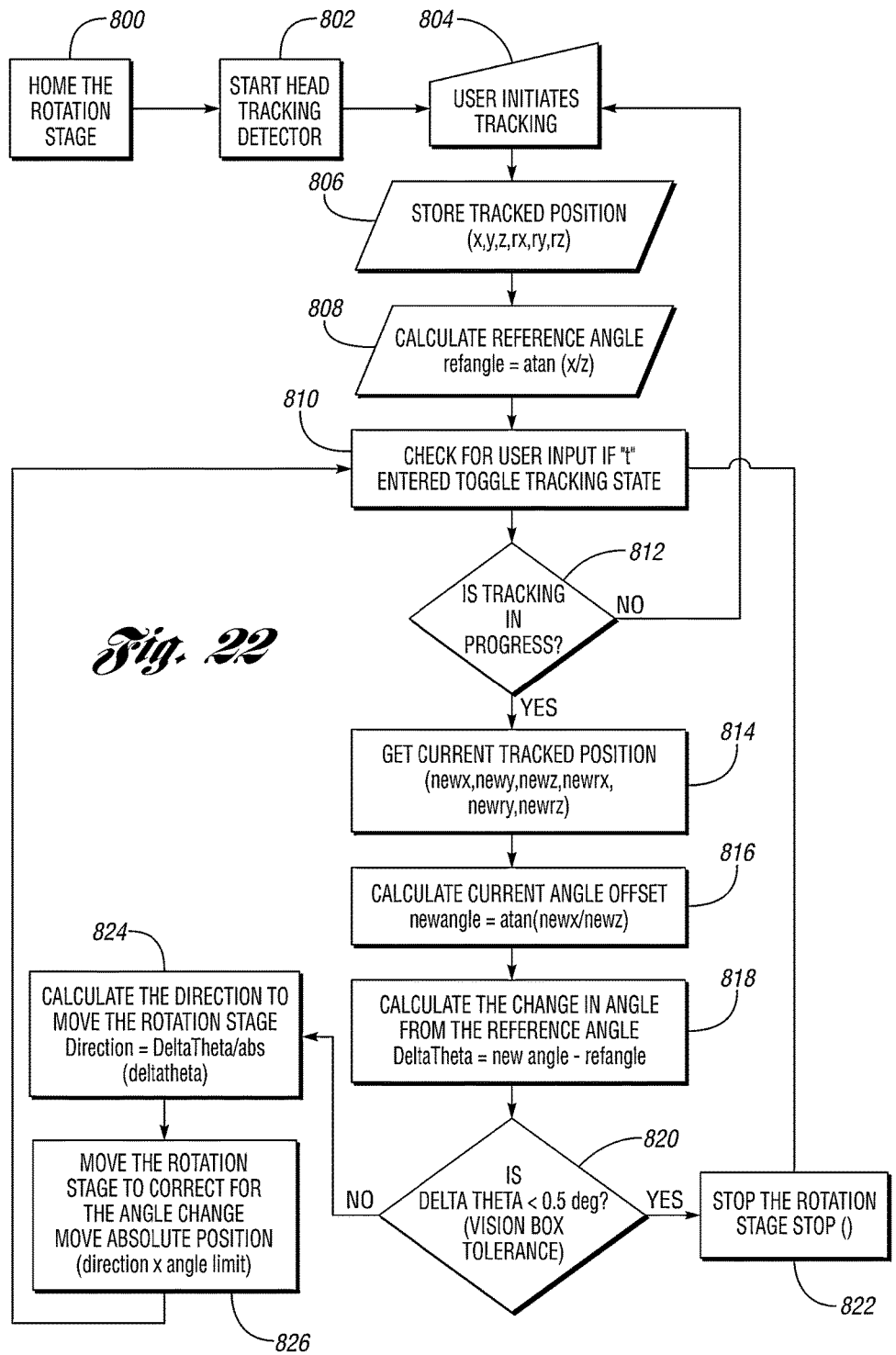
FIG. 22 is a block diagram illustrating operation of a system or method for maintaining alignment of a holographic optical element with eyes of a viewer according to embodiments of the present disclosure.

Referring now to FIG. 22, a block diagram illustrating operation of a viewer tracking function for use with various embodiments of an autostereoscopic display according to the present disclosure is shown. The diagram of FIG. 22 provides a representative strategy or means for synchronizing or moving viewing zones of an autostereoscopic display incorporating a reflective holographic optical element in response to viewer movement, which is sometimes referred to as head or eye tracking. The illustrated blocks represent a control strategy and/or logic generally stored as code or software executed by a microprocessor of a general purpose computer or special purpose microprocessor based controller, such as computer 778. However, code or software functions may also be implemented in dedicated hardware, such as FPGA's, ASIC's, or dedicated micro-controllers in communication with sensor 772 and motor/controller 794. In general, various functions are implemented by software in combination with hardware, as known by those of ordinary skill in the art. Code may be processed using any of a number of known strategies such as event-driven, interrupt-driven, multi-tasking, multi-threading, and the like, depending upon the particular implementation. As such, various steps or functions illustrated may or may not be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description.

In the illustrated approach, commercially available facial recognition software is used to process images from camera 772. The facial recognition software outputs distance and angle measurements for facial features of viewer 714 relative to camera 772 that are used by the tracking software of FIG. 22 to generate appropriate actuator commands for actuator 788. Block 800 of FIG. 22 represents a zeroing or homing function for actuator 788, typically performed on a system reset or during a power-on self-test (POST) procedure so that the starting position of the actuator is known. The tracking camera/sensor 772 is then initialized, as represented by block 802. The user or viewer may initiate a tracking mode via keyboard input from computer 778, for example, which results in the current position of viewer 714 being stored in memory as represented by block 806.

For the representative embodiment illustrated in FIG. 6, a reference angle is determined using only the x-axis and z-axis information generated by the facial recognition program by calculating the arc-tan(x/z) as represented by block 808. In block 810, keyboard input is monitored to determine whether to continue in tracking mode. The current tracking state (on or off) is toggled when appropriate keyboard input is received. Block 812 then determines whether tracking is in progress, i.e. whether facial features can be recognized by the image captured by camera 772. If the features are detected, then tracking is in progress and control continues with block 814. If facial features of viewer 714 move out of the field of view of camera 772 or can not otherwise be recognized, then tracking is no longer in progress until re-initiated by the user as represented by block 804.

The current tracked position is obtained at block 814 with a corresponding current angle offset determined at block 816 in a similar manner as described above with reference to block 808. A delta or change in angle from the previously stored reference angle is determined as represented by block 818. If the change in angle exceeds a corresponding threshold associated with the eye-box tolerance, such as 0.5 degrees, for example, then block 824 determines the direction of rotation and generates an actuator command to rotate the stage to correct for the change of angle as represented by block 826. Control then returns to block 810. If the change in angle is less than the corresponding threshold as determined by block 820, then the actuator is stopped as represented by block 822 and control continues with block 810.

Figure 23:
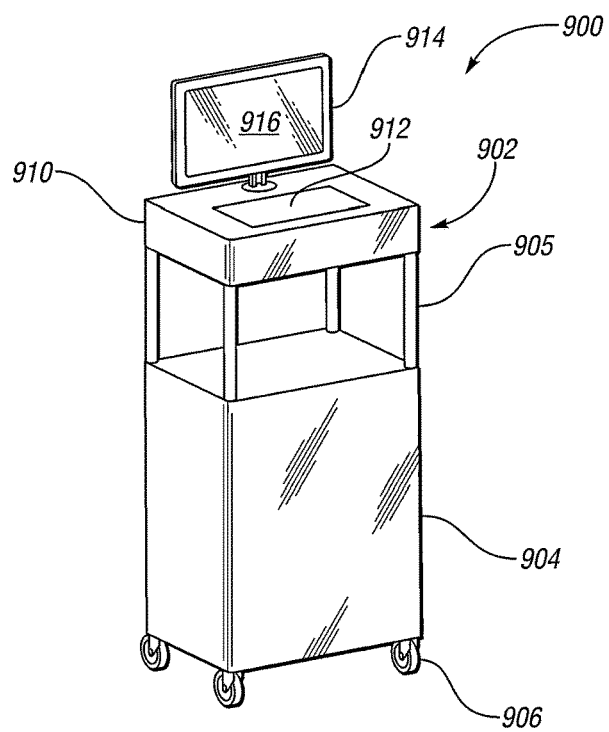
FIG. 23 is a perspective view of a portable autostereoscopic display incorporating a holographic optical element according to embodiments of the present disclosure.
Figure 24:
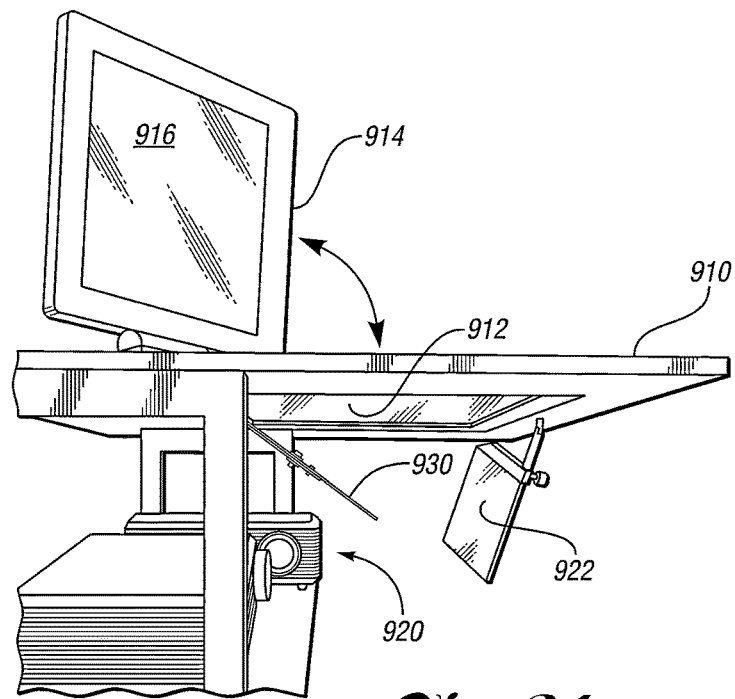
FIG. 24 is a cut-away side view illustrating positioning of various components of an autostereoscopic display according to embodiments of the present disclosure.
Figure 25:
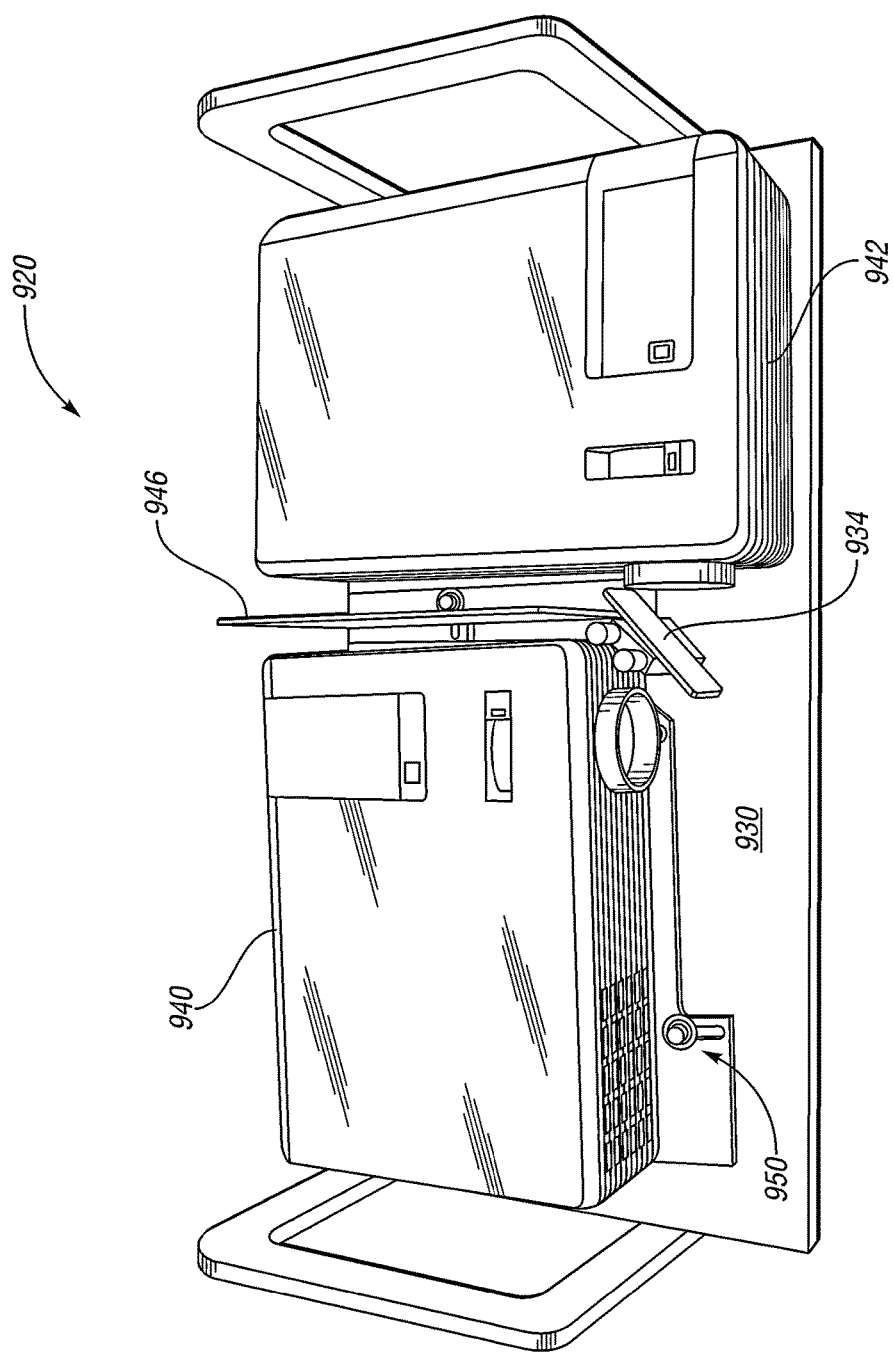
FIG. 25 is a cut-away top view illustrating positioning of various components of an autostereoscopic display according to embodiments of the present disclosure.

FIGS. 23-25 illustrate a portable autostereoscopic display having a holographic optical element and at least one projector according to embodiments of the present disclosure. Autostereoscopic display system 900 includes a table or desktop unit 902 mounted on a base cabinet 904 using risers 905, which may be adjustable to vary the viewing height of system 900. Base cabinet 904 may include a plurality of lockable wheels 906 to facilitate portability. Desktop unit 902 includes a cabinet, enclosure, or housing 910 including at least one projector and associated optics for illuminating holographic optical element 916 through window or aperture 912 to produce a three-dimensionally perceived image. Holographic optical element 916 may be mounted within a fixed or movable frame 914. In one embodiment, frame 914 includes at least one pivot hinge such that frame 914 can be closed to cover window or aperture 912. Aperture or window 912 and surrounding area may be recessed to receive frame 914 when folded down to provide a substantially flat work surface.

As best illustrated in the cut-away side view of FIG. 24, at least one projector 920 is positioned within cabinet 910. In the illustrated embodiment, two projectors 940, 942 are mounted within cabinet 910 and positioned with outputs generally perpendicular to each other as shown in FIG. 25. Projectors 940, 942 are mounted to a base plate 930 with projector 940 secured via an adjustable mount as indicated at 950. A mirror 934 is positioned to direct light output from projector 942 toward folding mirror 922 as shown in FIG. 24. Light from projector 940 is projected directly to folding mirror 922. A baffle 946 is mounted between projectors 940, 942 to manage cooling airflow.

During operation, screen 914 is opened to an operating position as illustrated. Light from projectors 940, 942 is reflected by folding mirror 922 through aperture or window 912 to holographic optical element 916. A light baffle or shield 930 may be provided to conceal or block the direct view of projectors 940, 942 by the viewer(s) through aperture or window 912. As previously described, projectors 940, 942, mirror 934, mirror 922, and screen 914 are positioned so that light from projectors 940, 942 co-illuminates holographic optical element 916 from about the same vertical or altitudinal angle as the corresponding recording angle used in recording holographic optical element 916, which is about 45° in a representative embodiment. Projectors 940, 942 may include optical keystone correction to correct for any keystone effects otherwise associated with illumination from above or below screen 914. In addition, projectors 940, 942 may be passively cooled to eliminate fan noise and associated circulation of dust or contaminants. Holographic optical element 916 is co-illuminated from slightly different horizontal or azimuthal angles with light reflected to associated left-eye and right-eye viewing zones as previously described.

Figure 26:
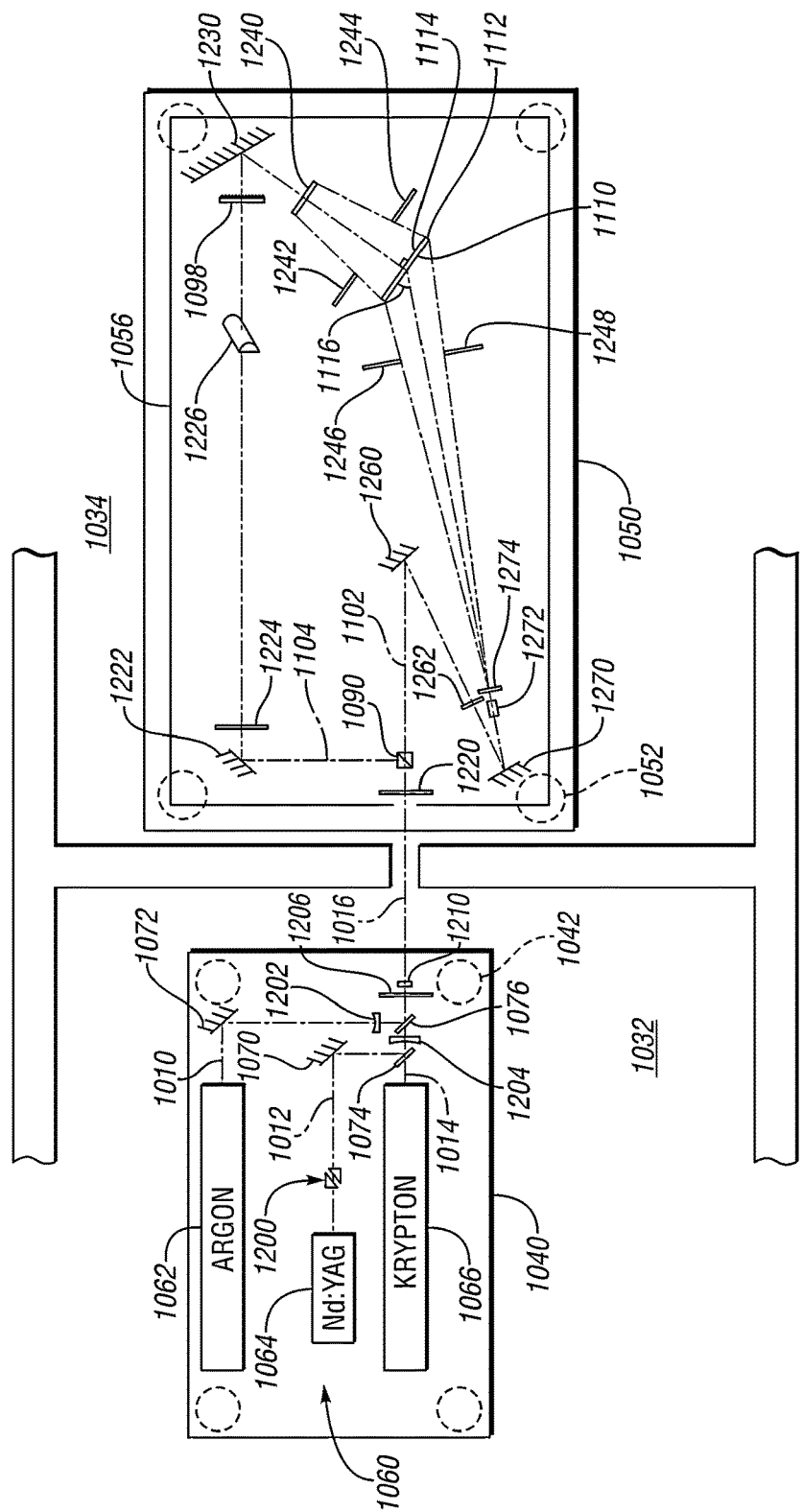
FIG. 26 is a block diagram illustrating a representative system or method for recording a holographic optical element with diverging reference and object beams for use in an autostereoscopic display according to embodiments of the present disclosure.
Figure 27:
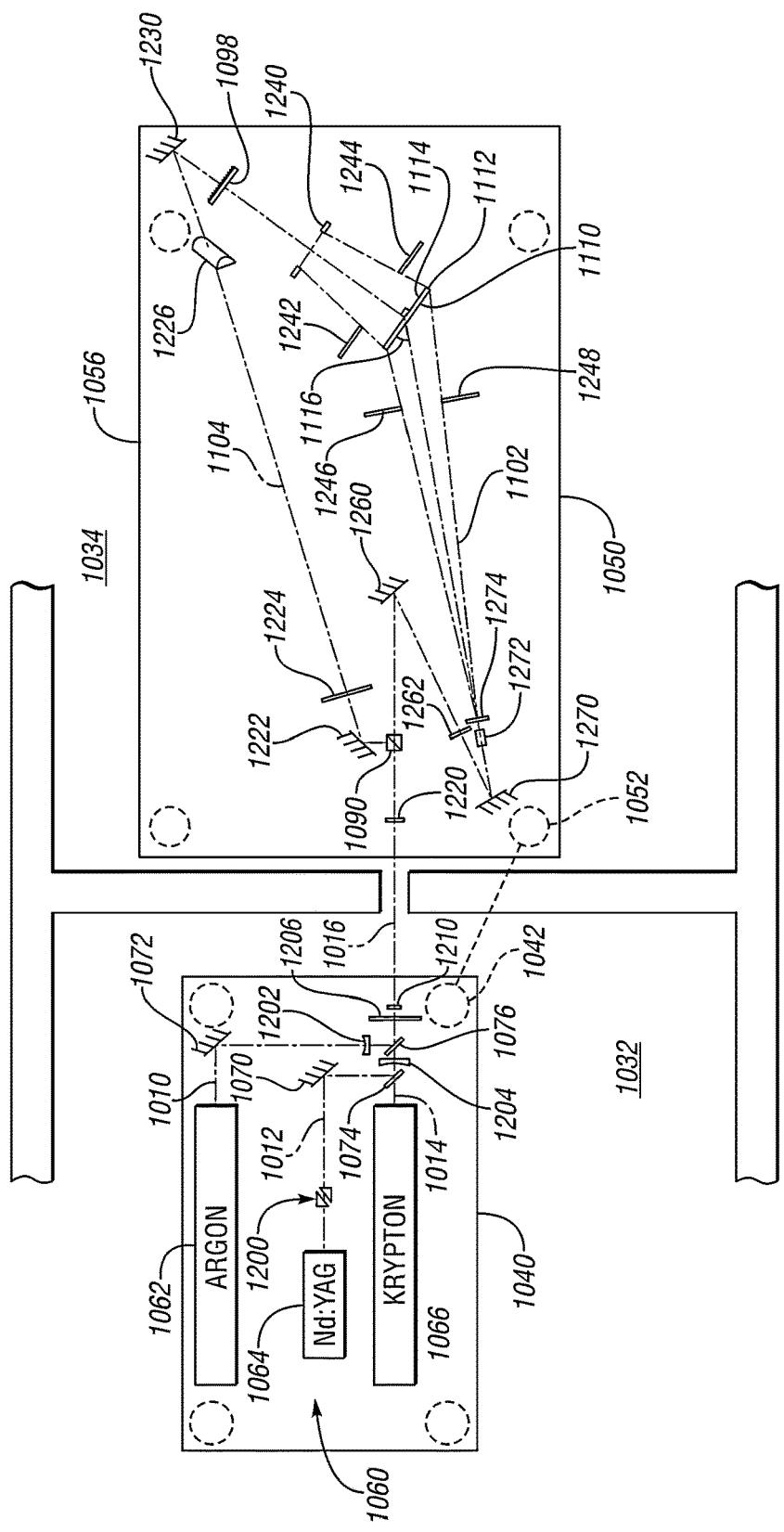
FIG. 27 is a block diagram illustrating another representative system or method for recording a holographic optical element with diverging reference and object beams for use in an autostereoscopic display according to embodiments of the present disclosure.

Other embodiments of a system or method for making a holographic optical element for an autostereoscopic display are illustrated in the diagrams of FIGS. 26 and 27. Unless otherwise indicated, these embodiments are similar to the arrangement of the embodiment illustrated in FIG. 1 with corresponding reference numerals associated with elements having similar structure and/or function as those described with reference to FIG. 1. For example, Argon laser 1062, Nd:YAG laser 1064, and Krypton laser 1066 illustrated in FIGS. 26 and 27 are similar in structure and function to Argon laser 62, Nd:YAG laser 64; and Krypton laser 66 of FIG. 1, etc.

As illustrated in FIGS. 26 and 27, at least three monochromatic coherent beams 1010, 1012, 1014 corresponding to red, green, and blue wavelengths, respectively, are combined to form a polychromatic coherent beam 1016. In the illustrated embodiments, the monochromatic coherent beams are provided by corresponding lasers 1060, which include an Argon laser 1062, Nd:YAG laser 1064, and Krypton laser 1066. However, those of ordinary skill in the art will recognize that a single source may be used to generate more than one monochromatic coherent beam depending on the particular application and implementation. Coherent beam 1010 is reflected by beam steering mirror 1072 toward dichroic beam combiner 1076. Similarly, coherent beam 1012 is reflected by beam steering mirror 1070 toward dichroic beam combiner 1074. Beam combiner 1074 combines beam 1014, which passes through combiner 1074, with beam 1012. The combined beam is then further combined with beam 1010 by combiner 1076 to form a recording beam 1016 that passes through aperture 1206. A shutter 1210 is used to control the exposure or recording time by selectively blocking or passing the recording beam 1016.

Monochromatic beams 1010, 1012, and 1014 may have different characteristics, such as beam diameters, intensities, beam shapes or profiles, etc. For example, Nd:YAG laser 1064 generally produces a beam having an elliptical cross-section or profile while lasers 1062 and 1066 produce beams having a circular profile. On or more optic elements 1200, implemented by an anamorphic prism pair in one embodiment, may be used to modify the profile or cross-section of beam 1012 to more closely match the beam profile or cross section of beams 1010 and 1014. Similarly, an optic element 1202, implemented by a −0.25 diopter lens in one embodiment, may be appropriately positioned to adjust the beam waist or diameter of beam 1010 to better align with beams 1012 and 1014. Likewise, optic element 1204, implemented by a −0.25 diopter lens in one embodiment, is appropriately positioned to modify the beam waist or diameter of the combined beams 1012 and 1014. Matching and alignment of beam profiles improves spatial filtering efficiency. Similar to the arrangement illustrated in FIG. 1, lasers 1060 are on a separate optic isolation table or bench 1040 as well as being positioned in a separate room 1032 relative to optical table 1050 disposed in room 1034 to improve system stability during exposure by reducing or eliminating transfer of vibrations associated with the laser cooling systems to the remaining setup.

During recording or exposure, shutter 1210 is opened to allow combined recording beam 1016 to travel into room 1034, through aperture 1220 to beam splitter 1090, implemented by a 50/50 non-polarizing beam splitter cube in one embodiment. Beam splitter cube 1090 divides the polychromatic recording beam into a polychromatic reference beam 1102 and polychromatic object beam 1104. Object beam 1194 reflects from folding mirror 1222 through aperture 1224 as a diverging beam. A beam expander, implemented by an elongated cylindrical lens 1226 in one embodiment, expands the beam to illuminate a first diffuser 1098 having a desired eyebox geometry. In one embodiment, first diffuser 1098 is implemented by a ground glass plate. Another generally planar beam steering or folding mirror 1230 directs the object beam to a second diffuser 1240, implemented by a directional diffuser in one embodiment to better conform, match, or map the aspect ratio of the object beam to holographic optical element 1112. In the representative embodiment illustrated, beam expander 1226 is positioned to expand the object beam in a first direction generally perpendicular to propagation with directional diffuser 1240 positioned to expand the beam in a second direction perpendicular to propagation and the first direction. Directional diffuser 1240 may be implemented by a 35°/75° holographic diffuser or similar device such as those available from Physical Optic Corp., for example, as previously described.

The object beam passes through elongated cylindrical lens 1226, first diffuser 1098, and second diffuser 1240 to illuminate a first side 1114 of holographic optical element 1112 at substantially a right angle. As previously described, element 1112 has one side coated with a panchromatic silver halide gelatin emulsion sensitized for one or more of the recording wavelengths. Fixed baffles 1242, 1244 may be positioned proximate the diverging object beam to block stray light and/or reflections during recording. Baffles 1242, 1244 also provide some damping of ambient air flow to improve system stability. The diverging object beam interferes with a diverging reference beam that illuminates element 112 at recording angle 1116 of about 45° from opposite side 1110 with the resulting interference pattern captured in the emulsion.

As also shown in FIGS. 26 and 27, reference beam 1102 is reflected by mirror 1260 through aperture 1262, and by mirror 1270 through a 10× telescope objective 1272 which focuses the beam at pinhole aperture or spatial filter 1274. The diverging beam exiting pinhole 1274 illuminates side 1110 of holographic optical element 1112 and interferes with object beam 1104 that illuminates element 112 from opposite side 1114. One or more baffles 1246, 1248 may be positioned proximate reference beam 1102 to block any stray light or reflections from reaching holographic optical element 1112 during recording and to proving airflow obstruction or damping as previously described. The path distance of object beam 1104 and reference beam 1102 should be matched within the coherence length of lasers 1060, and as close as practical for best performance. In one embodiment, the optical path distances of object beam 1104 and reference beam 1102 are matched within about 1 cm with lasers 1060 having a coherence length of about 1 m.

Figure 29:
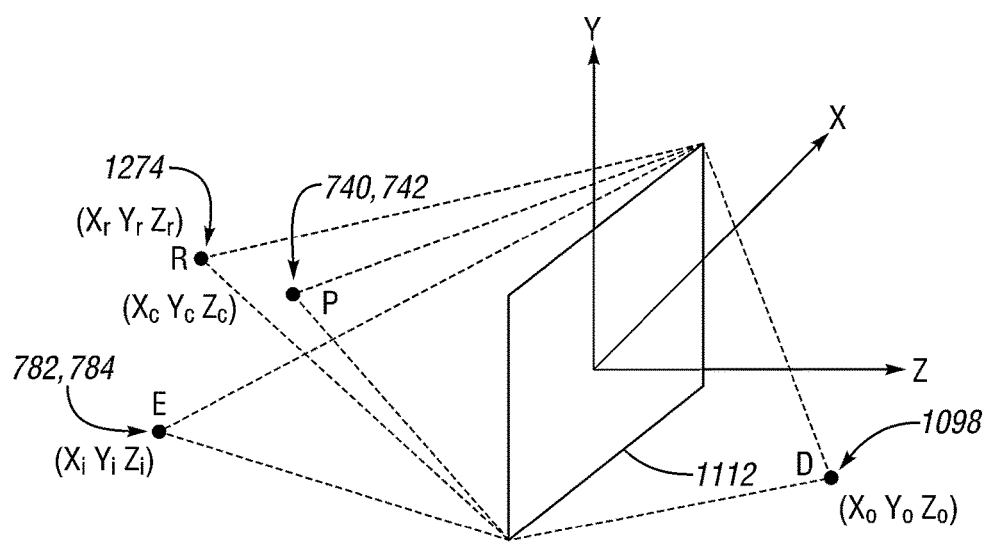
FIG. 29 is a diagram for use in determining positioning of the holographic optical element relative to the object and reference during recording and reconstruction/playback according to embodiments of the present disclosure.

Referring now to FIG. 29, a diagram illustrating positioning of holographic optical element 1112 relative to the eyebox being recorded to produce a desired eyebox during reconstruction/playback is shown. Points R, D, P, and E are contained within four representative planes corresponding to the position of the origin of the reference beam (R) at the spatial filter/pinhole aperture 1274, the ground glass or similar diffuser 1098 (D) having a geometry to record a desired eyebox, the position of the origin of the reconstruction/playback illumination (P) implemented by one or more projectors 740, 742, and the position of the projected eyeboxes (E) associated with rays 782, 784 of the autostereoscopic display for best viewing of a three-dimensional image. The plane passing through the panchromatic emulsion coated on the substrate of the holographic optical element 1112 is designated or defined as the plane of reference for the coordinate system used in the following representative calculations. The distance of the projected eyeboxes for best viewing relative to holographic optical element 1112 when positioned in an autostereoscopic display may be determined during recording by appropriate positioning of the various component planes represented in FIG. 29 relative to element 1112.

To simplify the analysis, each plane is represented by a corresponding point R, P, E, and D. In addition, the following formulas assume that no shrinkage takes place in the panchromatic emulsion during post processing, and that the reconstruction wavelengths of the projectors or other illumination sources match the wavelengths of the polychromatic object/reference beams during recording. For the reference coordinate system illustrated in FIG. 29, the position of the image (E) in the projected eyebox during playback is given by:

$$x_i = \frac{x_c z_o z_r + x_o z_c z_r - x_r z_o z_c}{z_o z_r + z_c z_r - z_o z_p} \quad (1)$$

$$y_i = \frac{y_c z_o z_r + y_o z_c z_r - y_r z_o z_c}{z_o z_r + z_c z_r - z_o z_p} \quad (2)$$

$$z_i = \frac{z_c z_o z_r}{z_o z_r + z_c z_r - z_o z_p} \quad (3)$$

Similar equations may be derived to determine the position of the remaining points. The above equations may be used to determine or modify the position(s) of various components for recording or playback/reconstruction of the recorded eyebox for viewing of a three-dimensional image for a particular application or implementation. For example, the viewing position relative to the holographic optical element in an autostereoscopic display may be adjusted using equation (3) to adjust one or more of the component positions in the recording set-up. As indicated by equation (3), changing position of the object ($D_{(xo, yo, zo)}$) for recording (implemented by a ground glass diffuser in one embodiment) results in a corresponding change in the distance/position of the image eyebox ($E_{(xi,yi,zi)}$) during viewing assuming that the reference beam position and projector position remains the same. Stated differently, moving the diffuser 1098 closer to element 112 (smaller $z_o$) for recording results in moving the eyebox closer to element 1112 (smaller $z_i$), and vice versa.

The embodiment illustrated in FIG. 27 is similar to the embodiment of FIG. 26 with like elements numbered accordingly. However, the embodiment of FIG. 27 has a somewhat different arrangement of optical components for the object beam with both first diffuser 1098 and second diffuser 1240 positioned downstream of beam steering mirror 1230.

As illustrated by the representative embodiments of FIGS. 26 and 27, a method for creating an autostereoscopic three-dimensionally perceived image includes generating a polychromatic recording beam 1016 having at least three monochromatic coherent light components 1010, 1012, and 1014. The method also includes separating the recording beam 1016 into an object beam 1104 and a reference beam 1102, the object beam 1104 passing through at least one divergent element, such as aperture 1224, a beam expander 1226 implemented by a generally transparent elongated cylinder lens, and at least one diffuser 1098, 1240 having a desired eyebox geometry to illuminate a first side 1114 of a substrate 1112 coated with a panchromatic silver halide gelatin emulsion. The method includes passing reference beam 1102 through at least one element 1262, 1274 to illuminate a second side 1110 of the substrate 1112 with a divergent reference beam 1102 during recording. The method may include modifying at least one beam property of at least one of the three monochromatic coherent light beams 1010, 1012, 1014 to more closely match one or more beam properties or characteristics, such as beam waist diameter or shape. In one embodiment, the method includes modifying a generally elliptical beam profile 1012 to a generally circular beam profile using an anamorphic prism pair 1200. Embodiments may also include modifying one or more monochromatic 1010 or polychromatic beams (produced by combining beams 1012 and 1014, for example) to match beam waist diameters using corresponding optic elements 1202, 1204, such as a telecentric beam expander or lens.

In one embodiment, an elongated cylindrical lens 1226 is used to expand the object beam along an axis transverse to propagation prior to illuminating a ground glass diffuser 1098. The object beam 1104 may be expanded to overfill element 1112 and provide a desired object/reference beam intensity or irradiance ratio, which may be between 1:4 and 1:7, for example, with an exposure time of between about 60-80 seconds, for example. Of course, beam ratios, exposure times, and various other parameters may vary depending on a number of factors, such as laser power, emulsion sensitivity, overfill factor, and the like. Alternatively beam splitter 1090 may be selected to provide other than a 50/50 split between the reference beam 1102 and object beam 1104. Various other elements may be used to achieve a desired object/reference beam ratio, although they may adversely impact system efficiency.

The method may also include modifying the aspect ratio of the object beam 1104 by passing through a directional diffuser 1240 before reaching the substrate 1112. Similarly, the method may include blocking reflected light by masking edges (255, FIG. 4B) of the substrate 1112 and/or positioning baffles 1242, 1244, 1246, 1248 proximate the divergent beam path of the reference 1102 and/or object beams 1104.

Figure 28:
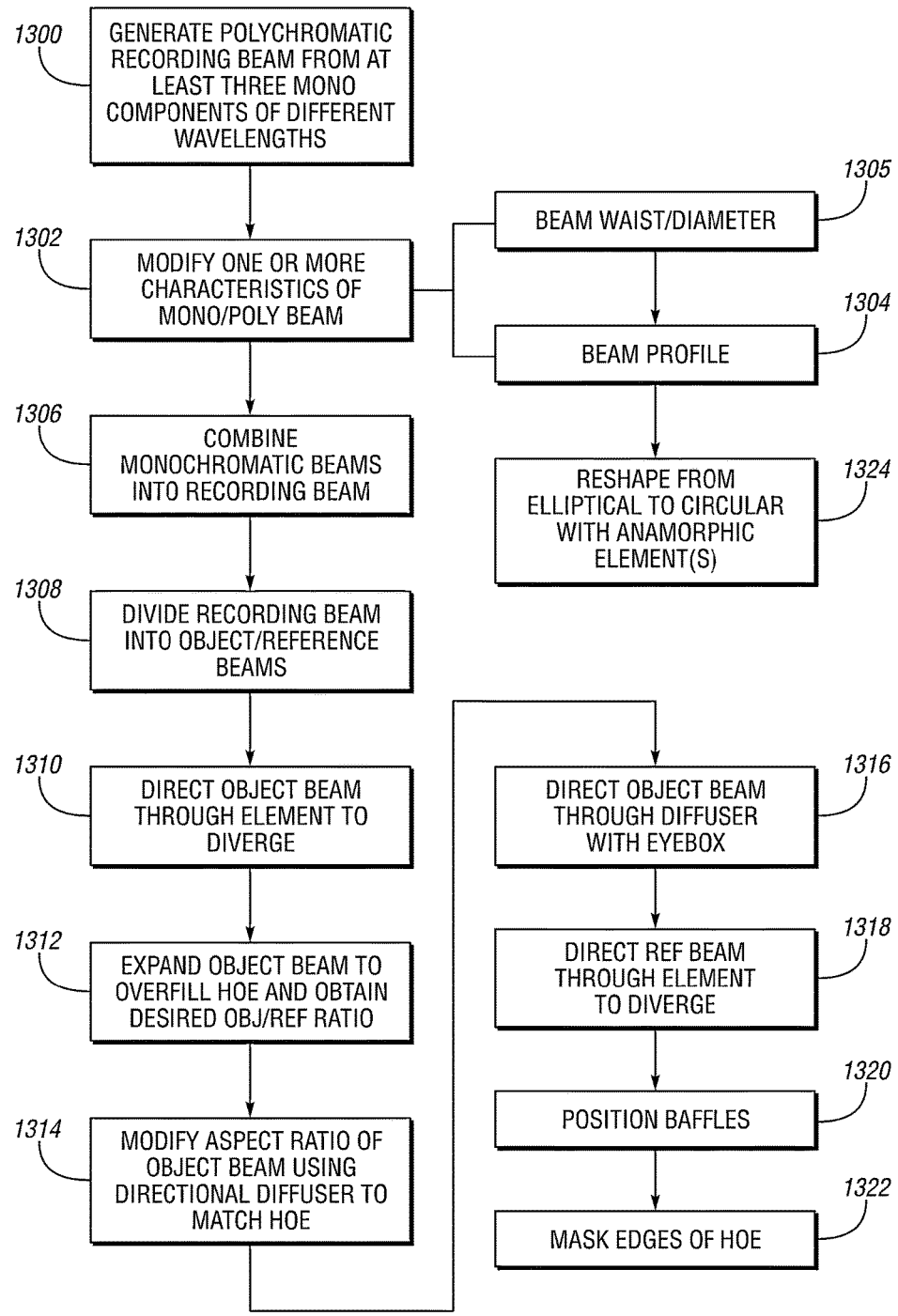
FIG. 28 is a block diagram illustrating operation of a system or method for recording a holographic optical element according to embodiments of the present disclosure.

FIG. 28 is a block diagram providing an alternative illustration for operation of a system or method for making a holographic optical element for use in an autostereoscopic display according to embodiments of the present disclosure. As illustrated in FIG. 28, a system or method for creating an autostereoscopic three-dimensionally perceived image includes generating a polychromatic recording beam having at least three monochromatic coherent light components as represented by block 1300. One or more of the monochromatic light beams may be modified to better match one or more properties to remaining component beams as represented by block 1302. This may include modifying beam waist/diameter as represented by block 1305 and/or modifying a beam profile as represented by block 1304, for example. In one embodiment, an anamorphic prism pair is used to reshape the beam profile of one of the beam components from a generally elliptical shape to a more circular shape as represented by block 1324. Alternatively, or in combination, beam diameters may be modified (increased or decreased) using telecentric optical devices to better match beam waists as generally represented by block 1305. The monochromatic coherent beams are combined into a recording beam using one or more dichroic beam combiners as represented by block 1306.

As also shown in FIG. 28, the recording beam is separated or divided into an object beam and a reference beam as represented by block 1308. The object beam passes through at least one element to provide a diverging object beam as represented by block 1310, and a beam expander represented by block 1312. The object beam may be expanded by the beam expander and one or more diffusers to provide a desired object/reference beam intensity ratio, which may be between about 1:4 and 1:7, for example. The aspect ratio of the object beam may be modified using a directional diffuser to better match the aspect ratio of the HOE as represented by block 1314. The object beam passes through at least one diffuser to project or image a desired eyebox at a desired distance relative to a first side of a substrate coated with a panchromatic silver halide gelatin emulsion as represented by block 1316. The system and method also include passing the reference beam through at least one element to illuminate a second side of the substrate with a diverging reference beam during recording as represented by block 1318. The method may include positioning baffles proximate the divergent beam path of the reference and/or object beams as represented by block 1320 and/or reducing or eliminating light entering the substrate of the HOE during recording by masking edges of the substrate as represented by block 1322.

As such, embodiments according to the present disclosure have various associated advantages. For example, embodiments of the present disclosure provide real-time stereo images to corresponding eyes of at least one viewer to produce a three-dimensionally perceived image without viewing aids, such as glasses or headgear. Various embodiments according to the present disclosure provide real-time viewer position detection and image display synchronization to allow the viewer to move while staying within predetermined viewing zones so that perception of the three-dimensional image is unaffected by viewer movement. Use of a reflection holographic element provides higher resolution and improves color fidelity of reflected images, both of which are desirable for a number of applications, such as medical imaging, video gaming, and personal entertainment devices, for example. Use of a beam shaping device in at least one of the reference and object beam paths during recording of a holographic optical element according to various embodiments of the present disclosure may provide more uniform illumination to reduce or eliminate vignetting during use and playback in an autostereoscopic display. Use of a directional diffuser provides significant improvements in object beam efficiency. Embodiments that use a diverging reference and object beam eliminate the need for a spherical or parabolic concave mirror to illuminate the HOE during recording. Matching of beam waists and/or profiles of two or more coherent sources improves the system efficiency and may improve uniformity of illumination and color balance across the HOE for better color fidelity during playback. Masking of the edges of the HOE during recording reduces or eliminates artifacts associated with total internal reflection (TIR) of stray light entering the substrate during recording. Similarly, appropriately positioned baffles provide air damping and block stray reflections or other light during recording of the HOE. Use of an aperture in combination with a cylindrical lens and directional diffuser improves efficiency with better mapping of the object eyebox to the aspect ratio of the HOE.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A system for making a holographic optical element for an autostereoscopic display, the system comprising:
    at least one coherent light source generating light of corresponding first, second, and third wavelengths;
    at least one beam combiner positioned to combine the first, second, and third wavelengths into a coherent recording beam;
    a non-polarizing beam splitter positioned to separate the recording beam into a reference beam and an object beam and that provides a reference beam to object beam ratio of about 1:1;
    at least one element positioned in each of the reference beam path and object beam path to generate a diverging reference beam and a diverging object beam that illuminate the holographic optical element from opposite sides;
    a beam expander comprising a generally transparent elongated lens positioned in the object beam path between the beam splitter and the diffuser;
    a diffuser positioned in the object beam path generally parallel to the holographic optical element to illuminate a first side of the holographic optical element during recording; and
    a generally planar mirror positioned in the object beam path to reflect diverging object beam light onto the first side of the holographic optical element during recording.

2. The system of claim 1 wherein the diffuser comprises a holographic directional diffuser having anamorphic diffusion selected based on an aspect ratio of the holographic optical element.

3. The system of claim 1 wherein the diffuser comprises a ground glass plate having a geometry and size associated with a desired eyebox geometry and size.

4. The system of claim 1 wherein the at least one element in the object beam path is positioned relative to the holographic optical element to overfill the holographic optical element.

5. The system of claim 1 wherein the at least one element positioned in the reference beam path comprises a telescope objective and pin hole aperture disposed at a focal distance of the telescope objective.

6. The system of claim 1 further comprising a second diffuser positioned in the object beam path, wherein the second diffuser comprises a directional diffuser having an exit divergence angle of about 45 degrees along a first axis perpendicular to propagation and an exit divergence angle of about 75 degrees along a second axis perpendicular to the first axis.

7. The system of claim 1 wherein the holographic optical element comprises a substrate having a single layer panchromatic silver halide emulsion coated on one side, the substrate having masked edges to reduce or eliminate light entering an edge of the substrate during recording.

8. The system of claim 1 further comprising a plurality of baffles positioned proximate the object beam and reference beam.

9. The system of claim 1 further comprising at least one optical device positioned upstream of the beamsplitter that modifies at least one property of at least one of the first, second, and third wavelengths.

10. The system of claim 9 wherein the at least one optical device comprises an anamorphic prism pair to modify a beam profile from a generally elliptical beam to a generally circular beam.

11. The system of claim 9 wherein the at least one optical device comprises a lens positioned to match beam diameters of the first, second, and third wavelength beams.

12. A method for making a holographic optical element, comprising:
   generating a polychromatic recording beam having at least three monochromatic coherent light components;
   separating the recording beam into an object beam and a reference beam using a beam splitter;
   modifying at least one beam characteristic of at least one of the three monochromatic coherent light components upstream of the beam splitter to better match a corresponding characteristic of other ones of the three monochromatic coherent light components;
   propagating each of the object and reference beams through at least one optical element to generate diverging object and reference beams;
   expanding the object beam and illuminating a diffuser with the expanded object beam, the diffuser having a geometry associated with a desired eyebox geometry such that diffuse light exiting the diffuser illuminates the holographic optical element from a first side;
   directing the diverging reference beam to illuminate the holographic optical element from an opposite side.

13. The method of claim 12 wherein modifying comprises changing beam shape of at least one of the three monochromatic coherent light components from generally elliptical to generally circular.

14. The method of claim 12 wherein modifying comprises changing beam diameters of at least one of the three monochromatic coherent light components.

15. The method of claim 12 wherein expanding comprises propagating the object beam through an elongated cylindrical lens.

16. The method of claim 12 wherein expanding comprises expanding the object beam to overfill the holographic optical element and to provide an object/reference beam ratio of between about 1:4 and 1:7.

17. The method of claim 12 wherein expanding comprises expanding along first and second axes perpendicular to propagation with a divergence angle along the first axis greater than a divergence angle along the second axis.

18. The method of claim 17 wherein expanding comprises propagating through a holographic directional diffuser.

19. A system comprising:
   a motor-controlled rotatable stage;
   a holographic optical element secured for movement with the rotatable stage, the holographic optical element having an eyebox recorded in a single layer panchromatic emulsion exposed to at least three wavelengths of coherent recording light combined in a recording beam divided substantially equally into a reference beam and object beam passing through corresponding optical elements to generate diverging reference and object beams, expanding the object beam so that the object beam overfills the holographic optical element to provide an object/reference beam ratio of between about 1:4 and 1:7 during recording;
   at least one illumination source secured for movement with the rotatable stage, the at least one illumination source illuminating the holographic optical element from two different horizontal angles to form generally coextensive left-eye and right-eye images within corresponding left-eye and right-eye viewing zones within a predetermined range in front of the holographic optical element;
   a viewer sensor that generates a signal in response to movement of a viewer; and
   a controller in communication with the rotatable stage and the viewer sensor, the controller controlling rotation of the stage in response to viewer movement to maintain alignment of the left-eye and right-eye viewing zones with the viewer.

20. The system of claim 19 wherein the at least one illumination source illuminates the holographic optical element with light corresponding to the at least three wavelengths of recording light.

* * * * *